United States Patent
Sun et al.

(10) Patent No.: US 11,256,807 B2
(45) Date of Patent: Feb. 22, 2022

(54) MITIGATION OF RETURN-ORIENTED PROGRAMMING EXPLOITS

(71) Applicant: Intel Corporation, Santa Clara, CA (US)

(72) Inventors: Ke Sun, Portland, OR (US); Rodrigo Branco, Hillsboro, OR (US); Kekai Hu, Portland, OR (US)

(73) Assignee: Intel Corporation, Santa Clara, CA (US)

(*) Notice: Subject to any disclaimer, the term of this patent is extended or adjusted under 35 U.S.C. 154(b) by 125 days.

(21) Appl. No.: 16/453,716

(22) Filed: Jun. 26, 2019

(65) Prior Publication Data

US 2019/0318094 A1    Oct. 17, 2019

(51) Int. Cl.
*G06F 21/00* (2013.01)
*G06F 21/56* (2013.01)

(52) U.S. Cl.
CPC .......... *G06F 21/566* (2013.01); *G06F 21/568* (2013.01); *G06F 2221/033* (2013.01)

(58) Field of Classification Search
CPC . G06F 21/566; G06F 21/568; G06F 2221/033
See application file for complete search history.

(56) References Cited

U.S. PATENT DOCUMENTS

2017/0243002 A1    8/2017  Polychronakis et al.
2018/0039776 A1*   2/2018  Loman .................... G06F 21/54

OTHER PUBLICATIONS

Polychronakis, M. and Keromytis, A.D., Oct. 2011. ROP payload detection using speculative code execution. In 2011 6th International Conference on Malicious and Unwanted Software (pp. 58-65). IEEE. (Year: 2011).*
Baratloo, A., Singh, N. and Tsai, T.K., Jun. 2000. Transparent run-time defense against stack-smashing attacks. In USENIX Annual Technical Conference, General Track (pp. 251-262). (Year: 2000).*
Francillon, A., Perito, D. and Castelluccia, C., Nov. 2009. Defending embedded systems against control flow attacks. In Proceedings of the first ACM workshop on Secure execution of untrusted code (pp. 19-26). (Year: 2009).*
Prandini, M. and Ramilli, M., 2012. Return-oriented programming. IEEE Security & Privacy, 10(6), pp. 84-87. (Year: 2012).*
Schuster, F., et al., "Evaluating the Effectiveness of Current Anti-ROP Defenses," Ruhr-Universitat Bochum; Technical Report TR-HGI-2014-001; 22 pages (May 5, 2014).

* cited by examiner

*Primary Examiner* — Alexander Lagor
(74) *Attorney, Agent, or Firm* — Patent Capital Group

(57) ABSTRACT

A computing apparatus, including: a processor; a memory; and encoded logic to instruct the processor to: identify within the memory a payload that is suspected to be a return-oriented programming (ROP) chain; execute the suspected ROP chain in a speculative execution path within the processor; force a missed prediction of the speculative execution path; determine that the suspected ROP chain executed through; and take a security action responsive to the determining.

21 Claims, 18 Drawing Sheets

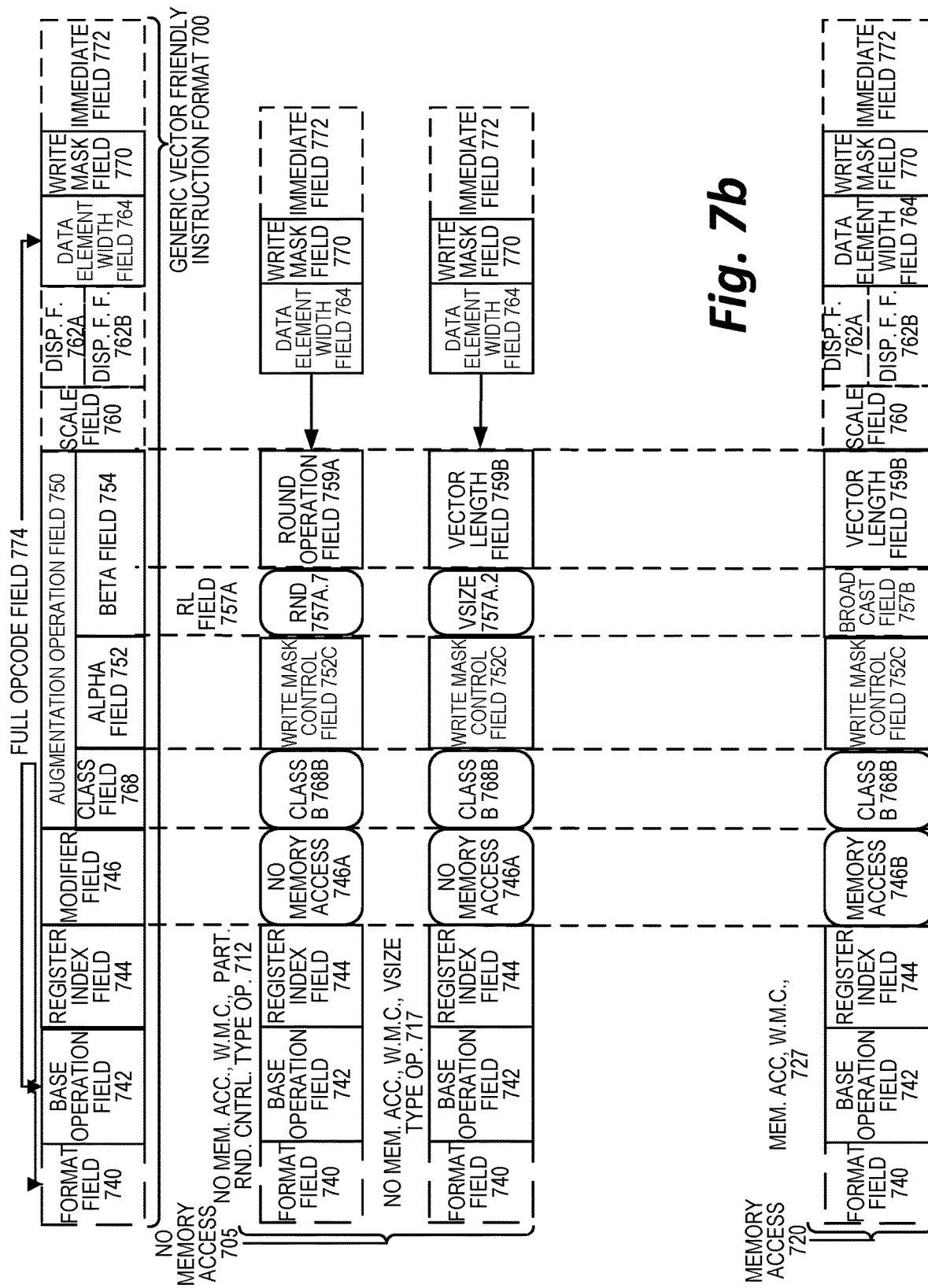

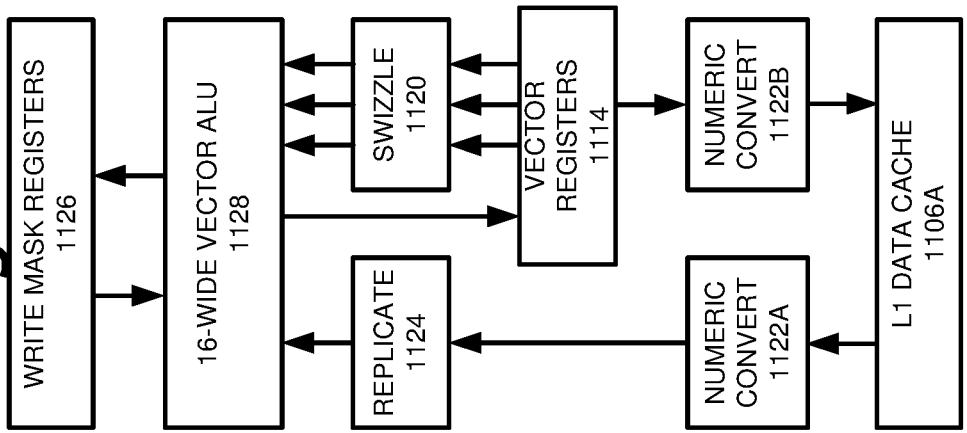
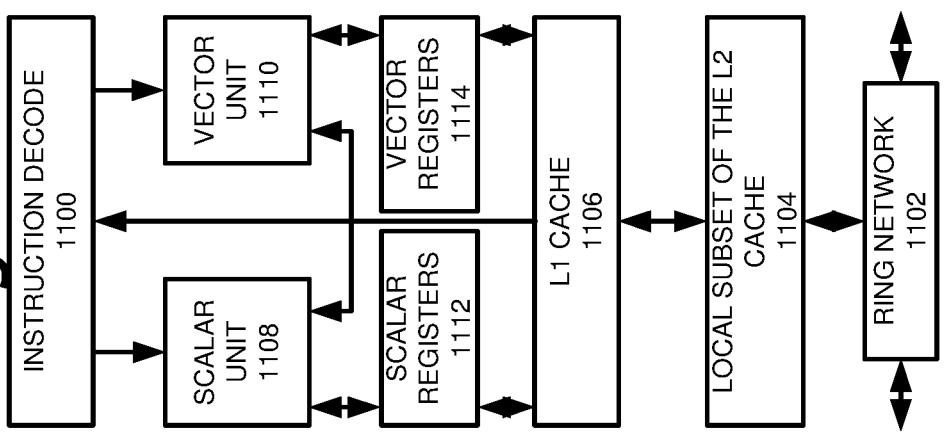

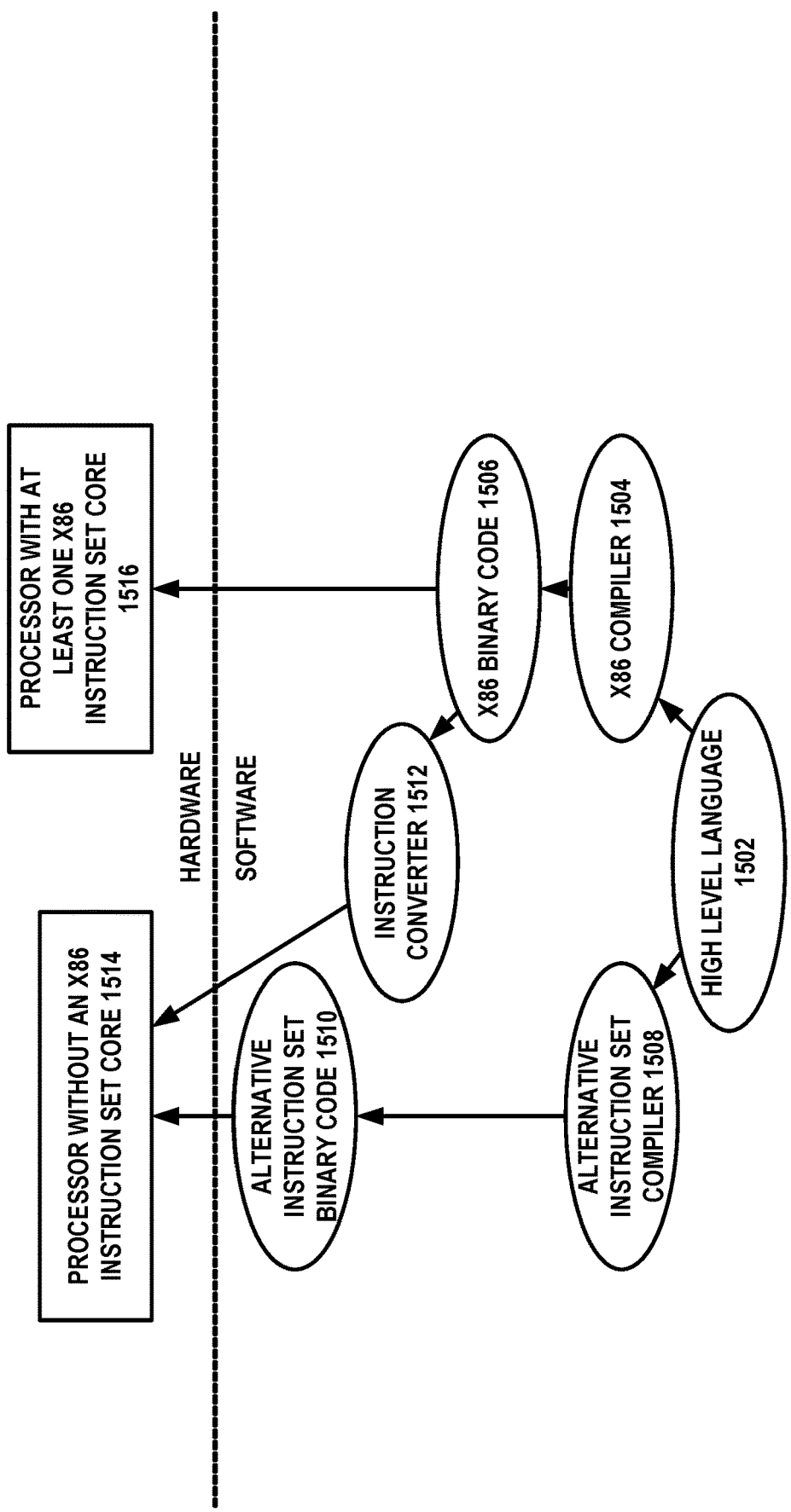

MITIGATION OF RETURN-ORIENTED PROGRAMMING EXPLOITS

FIELD OF THE SPECIFICATION

This application relates in general to computer security, and more particularly, though not exclusively, to a system and method to provide mitigation of return-oriented programming exploits.

BACKGROUND

Modern computing ecosystems often include "always on" broadband Internet connections. These connections leave computing devices exposed to the Internet, and the devices may be vulnerable to attack.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

FIGS. 7a-7b are block diagrams illustrating a generic vector-friendly instruction format and instruction templates thereof.

FIGS. 11a-11b illustrate a block diagram of a more specific in-order core architecture, which core would be one of several logic blocks (including other cores of the same type and/or different types) in a chip.

FIG. 15 is a block diagram contrasting the use of a software instruction converter to convert binary instructions in a source instruction set to binary instructions in a target instruction set.

EMBODIMENTS OF THE DISCLOSURE

Figure 1:
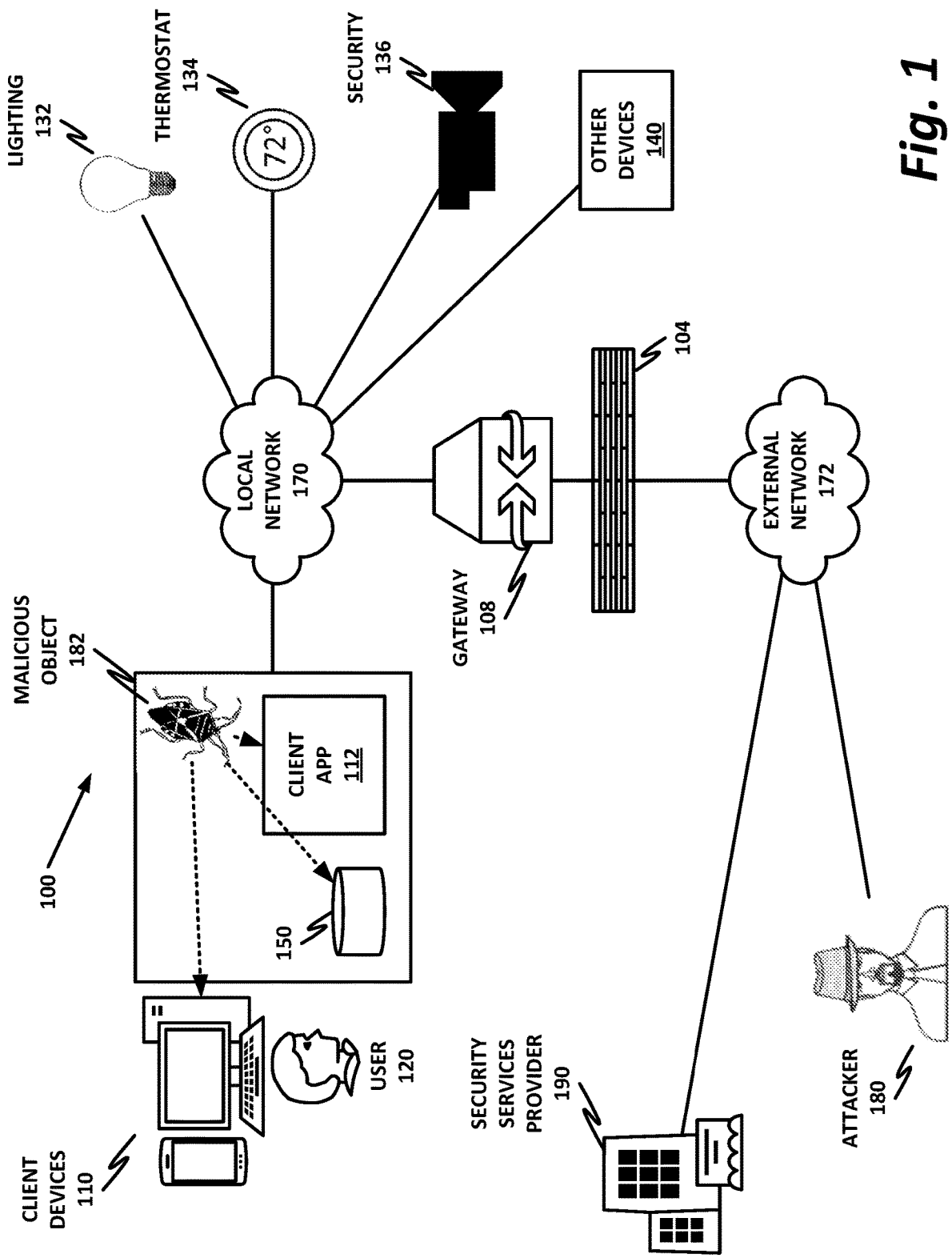
FIG. 1 is a block diagram illustrating selected elements of a security ecosystem.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Return-oriented programming (ROP) is a computer security exploit that has been successful in attacking systems, even in the presence of security mechanisms such as protected memory regions, executable space protection, and code signaling. An ROP attack includes the attacker gaining access to the stack and hijacking programmed flow control to execute instruction sequences selected from values already present in memory. For example, an attacker may scan memory to identify a value that coincides with the desired instruction operation code (opcode). The identified instructions are called ROP "gadgets." Each gadget, comprising one or more instruction opcodes, is followed by a return instruction. Because the gadgets are located within the instruction space of the existing program or in a shared library code, they appear in the instruction space as expected. Thus, security mechanisms that enforce executing instructions only from an instruction space may not, by themselves, be effective at stopping an ROP attack. When the attacker chains together a number of gadgets, the attacker is able to effectively perform an arbitrary code sequence, and to carry out work useful to the attacker.

With the prevalence of modern security mechanisms that provide exploitation protection, such as data execution prevention (DEP), ROP has become a popular attack. To security researchers, this introduces a novel challenge of identifying ROP payloads for intrusion detection and prevention systems, as well as host intrusion prevention systems. Detection and mitigation are more difficult because ROP payloads may not directly contain strings of instructions, as would be common in a traditional "shell code" attack. The present specification provides a novel detection and mitigation system and method that is able to identify an ROP payload and to mitigate its effect. For example, one embodiment uses the speculative code execution capability of the central processing unit (CPU) to determine whether a suspected ROP chain is, in fact, an ROP attack. This method achieves superior detection efficiency in a more secure manner and with greater efficiency than at least some existing techniques.

For example, existing solutions may detect ROP payloads based on dynamic code analysis, simulation, and/or emulation. This code analysis is performed before the suspicious code is run. In these cases, to precisely emulate the execution of the shell code, the emulator creates a virtual memory space that snapshots the complete address space of a real process, then runs the potential shell code in the virtual memory space to see whether it is malicious or not. Effects of the suspected malicious code can be observed, and based on this dynamic analysis, the system may either mark the payload as malicious or not, and appropriate remedial action may be taken.

However, this simulation or emulation-based approach results in higher resource costs. A full-blown snapshot of a complete address space per process is required for the emulation. In a real-world system that runs multiple processes at a time, the resource cost of creating virtual memory snapshots is quite expensive. Furthermore, this system results in high performance overhead. A significant performance overhead impact occurs because the program is executed in the emulation environment for the detection of the ROP payload. While this may be effective in identifying ROP payloads, it results in performance impacts that may be unacceptable in real-world use cases. Furthermore, the emulation approach may encounter compatibility limitations. If an enterprise has multiple versions of a particular software (e.g., they have deployed Word 2013 and Word 2016), it is harder to emulate for all cases. And even where all cases can be identified, it is performance-limiting to have to test each piece of suspected malware against every potential use case.

The present specification provides an advantageous solution in which a CPU's speculative code execution capabilities can be used instead of an emulator to detect ROP payload. This approach takes advantage of the fact that uncommitted speculative execution (e.g., a code sequence speculatively executed due to a branch misprediction) does not affect the architectural states of the hardware.

For example, in a common CPU architecture, performance is improved by looking at conditional statements and predicting the most likely result of the conditional statements. A common example is a loop that executes many times. If the CPU encounters the branching instruction and determines that the pipeline can't be filled and the cache can't be populated because the CPU does not know which branch will be taken, then every instance of the loop may result in cache misses and pipeline stalls. This substantially reduces the efficiency of the CPU. However, CPU designers recognize that in a loop, the number of times the loop is taken may vastly outnumber the number of times the loop branch is not taken. Thus, the CPU may predict that it is most likely that the loop will be taken. The CPU fills the pipeline, fills the cache, and executes instructions as though the loop were taken. In most cases, the prediction is correct, and the CPU can use the results of the correct prediction. In some cases, the prediction is incorrect, and the predicted result must be "walked back," and the program continues to execute from the non-predicted branch. Some modern high-end CPUs achieve correct branch prediction of over 99%, and in fact rely on nearly perfect branch prediction to achieve high performance.

Because a missed branch prediction does not, by design, affect any of the architectural states of the real execution flow, it is safe to perform a trial execution of a suspected ROP chain in a speculative path as long as that speculative path is a missed prediction. However, although the architectural states are walked back, whatever was loaded into cache is necessarily still there, as though the architectural state had not been walked back. This cache state is what makes may "side channel" type attacks possible. However, a security engine can also take advantage of this situation to mitigate ROP attacks.

For example, when a system encounters a suspected ROP payload, it may be usefully assumed (in some cases) that if the instructions chain together as expected, then the payload is malicious. Rather than running the suspected ROP payload in an emulator, the system can force a missed prediction and execute the suspected payload in the speculative path. If the chain executes through, then it is a "valid" chain, and may be marked malicious or suspicious. One method of determining whether instructions chain together as suspected is to insert a "canary" instruction at the end of the suspected instruction chain instruction to insert a "label". This label could include, for example, loading a dummy value from a particular memory location to the cache.

Once the speculative execution is complete and the CPU "backs out" of the (forced) missed prediction, the CPU can check to see whether the dummy value was loaded from memory to cache. One illustrative method leverages a cache-based timing side channel in the speculative execution to bring an identification label into cache. If the suspected chain input data is an ROP payload, it will bring the identification label into cache because it will reach the canary instruction at the end of the chain. If the value is not in cache, then the ROP payload did not reach the end of the chain, and it can be concluded that the suspected payload is not an ROP chain.

In one embodiment, to check whether the dummy load instruction was reached, the CPU attempts to read the target memory address. If the instruction was reached, the memory location was fetched into cache, and the memory location can be accessed within a number of clock cycles consistent with a cached value. In some modern CPUs, this will occur on the order of tens to low hundreds of cycles. On the other hand, if the dummy load instruction was not reached, then the value will need to be fetched from main memory. In this case, the load instruction will complete in hundreds to low thousands of clock cycles on a modern CPU.

By observing whether the load instruction completes in tens to low hundreds of cycles versus hundreds to low thousands of cycles, the system can determine whether the canary instruction was executed at the end of the ROP chain. If the value was fetched to cache, then the instruction was reached, and the suspected ROP payload can be marked as malicious, or other remedial action may be taken.

Alternatively, the analysis of whether the canary label is in cache need not be based on assumptions regarding cache access times. The system could, for example, first measure a baseline (e.g., the number of cycles to read from the label from memory). A cache flush may then be performed, and the value may be read again. By comparing the new read time with the old read time, the system may determine if the canary label was in cache, or whether it was still in memory (e.g., it was not loaded to cache before the first read).

Further advantageously, the method described herein provides low resource overhead. Because the method uses the existing CPU speculative code execution, there is no need to create a specific per-process snapshot of the memory space. This removes a major resource overhead component that is found in emulation-based solutions. This solution may also yield low-performance overhead. Rather than running a program in an emulator, which causes notable performance overhead, speculative execution takes advantage of existing CPU hardware paths, so that the performance overhead is much lower.

Furthermore, the method described herein provides increased security. Executing an ROP payload can be potentially risky, even in an instrumented or emulated environment. Some studies have shown that it is possible for target code to escape or hijack the control flow while being analyzed in dynamic analysis. In contrast, the method described herein provides for execution of the potential ROP payload in a speculative path that will never be architecturally committed. This eliminates the risk of control flow hijack by the malicious input.

A system and method for providing mitigation of return-oriented programming exploits will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a block diagram illustrating selected elements of a security ecosystem 100. Security ecosystem 100 may be configured to provide mitigation of return-oriented programming exploits, as disclosed in the present specification.

In the example of FIG. 1, security ecosystem 100 may be an enterprise, a government entity, a data center, a telecommunications provider, a "smart home" with computers, smart phones, and various Internet of things (IoT) devices, or any other suitable ecosystem. Security ecosystem 100 is provided herein as an illustrative and nonlimiting example of a system that may employ, and benefit from, the teachings of the present specification.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the Internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the Internet. Local network 170 may also provide access to an external network, such as the Internet, via external network 172. External network 172 may similarly be any suitable type of network.

Local network 170 may connect to the Internet via gateway 108, which may be responsible, among other things, for providing a logical boundary between home network 172 and external network 170. Local network 170 may also provide services such as dynamic host configuration protocol (DHCP), gateway services, router services, and switching services, and may act as a security portal across local boundary 104.

Local network 170 may also include a number of discrete IoT devices. For example, local network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as security software, security updates, network appliances, or similar. Security services provider 190 may be used to protect local network 170 and the various devices connected to it.

It may be a goal of users 120 to successfully operate devices on local network 170 without interference from attacker 180. In one example, attacker 180 is a malware author whose goal or purpose is to cause malicious harm or mischief, for example, by injecting malicious object 182 into client device 110. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against local network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 170 may contract with or subscribe to a security services provider 190, which may provide security services, updates, antivirus definitions, patches, products, and services. In some cases, security services provider 190 may include a threat intelligence capability. Security services provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Attacker 180 may use various methods to try to attack client devices 110 and their host enterprise. For example, if client devices 110 belong to an enterprise that has valuable information or that otherwise may provide value if compromised, attacker 180 may insert malicious object 182 into a client device to attack the client device. If client device 110 is a modern device with, for example, data execution prevention (DEP), then attacker 180 may use a more sophisticated method like return-oriented programming (ROP). ROP is a computer security exploit technique that enables an attacker to execute code in the presence of security defenses such as executable space protection and code signing. In this technique, the attacker gains control of a call stack to hijack the program control flow. The attacker chooses machine instruction sequences (or even individual instructions) already present in the machine's memory. These instructions or instruction sequences are referred to as "gadgets." Each gadget typically ends with a return instruction that returns program flow to the main process. The attacker then continues to execute another gadget as though it were a new subroutine. The gadgets themselves may already exist as instructions or sequences of instructions in an existing program and/or shared library. When chained together, these gadgets allow the attacker to execute arbitrary code in a manner similar to exploits that would install "worms" as binary objects. An ROP attack may be used to defeat security mechanisms such as DEP and similar.

Figure 2:
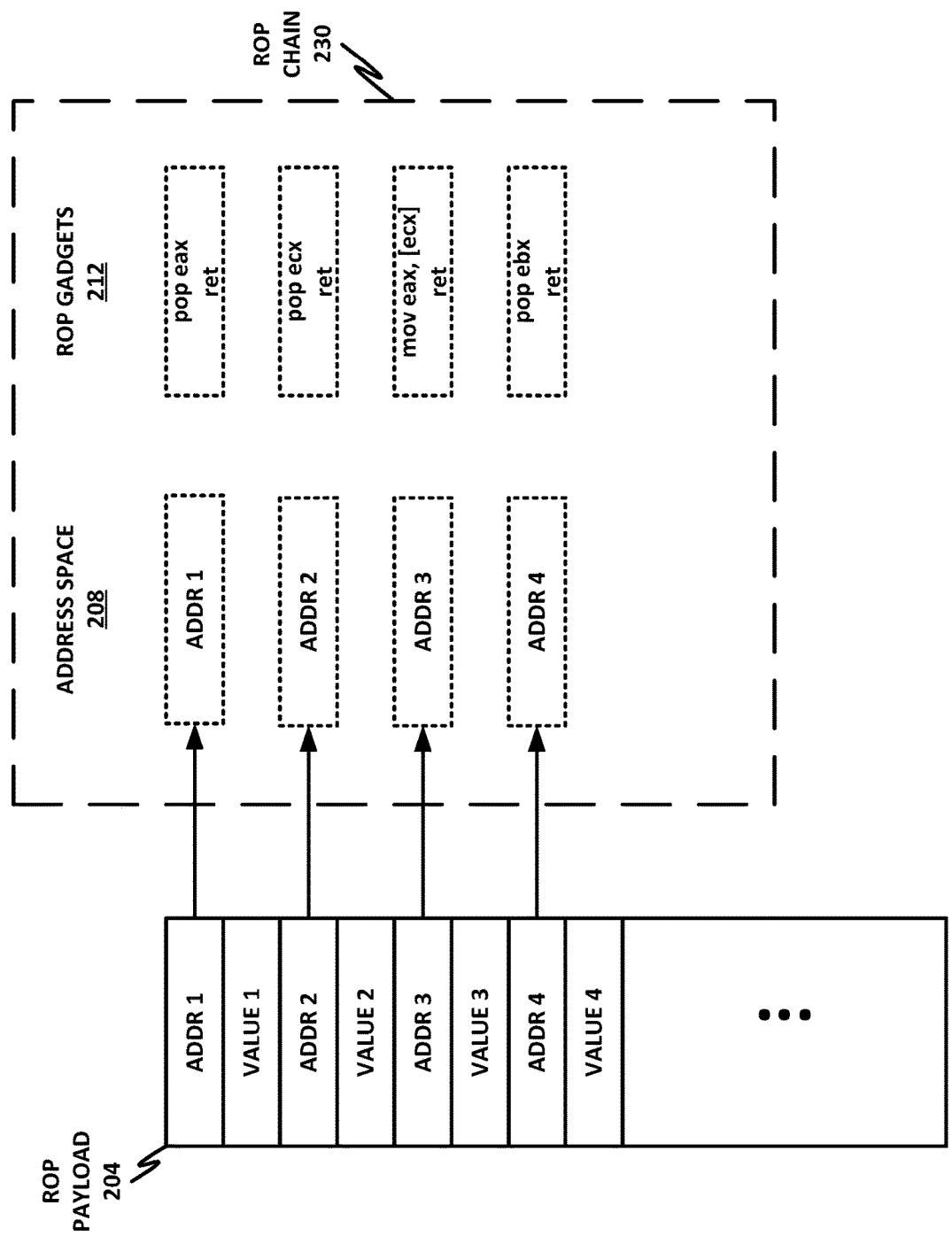
FIG. 2 is a block diagram illustrating an example return-oriented programming (ROP) chain.

FIG. 2 is a block diagram illustrating an example ROP chain 230. In this case, an ROP payload 204 attacks an address space 208 that may be a running program, a shared library, or similar. Address space 208 includes a number of instructions or instruction sequences located at the various addresses. Instructions at the various addresses may be chained together as ROP gadgets 212 to execute a fully-formed ROP chain 230.

In an exploit, ROP payload 204 is written to the call stack by an attacker as a "data" input. As seen on the right, address space 208 includes corresponding ROP gadgets 212, based on the payload in the process address space. In the example of FIG. 2, four ROP gadgets are shown to illustrate that an attacker controls four different addresses, namely address 1, address 2, address 3, and address 4. Gadget 1 pops value 1 to register "eax." Gadget 2 pops value 2 to register "ecx." Gadget 3 loads the value from the memory location pointed to by value 2 (in ecx) to eax. Gadget 4 pops value 4 to register "ebx."

In this example, as is common in ROP practice, each gadget ends with a return instruction (RET) that transfers the control flow to the next gadget.

This example illustrates a successful ROP gadget chain. Traditionally, two preconditions allow an ROP gadget chain to successfully execute:
1. All of the addresses in the payload are valid and executable.
2. All of the gadgets end with proper control flow transfer instructions, e.g., a return at the proper position. This could also include other control flow instructions, such as jump-oriented programming (JOP), or other jump or branching instructions. Typically, an ROP gadget will not include any other control flow transfers in the gadget (e.g., an ROP gadget typically will not include a call instruction that branches to a new subroutine).

An ROP gadget that meets the requirements above will reach the end of the chain and fulfill its intended goal. On the other hand, if a suspected ROP gadget does not meet these conditions, the payload will result in a chain that breaks in the middle of the chain and never reaches the end of the chain. Once the chain is broken, it can be inferred that the suspected ROP payload is not a malicious ROP chain, or at least that if the payload is an ROP chain with malicious intent, it is not one that can successfully execute to completion.

Figure 3:
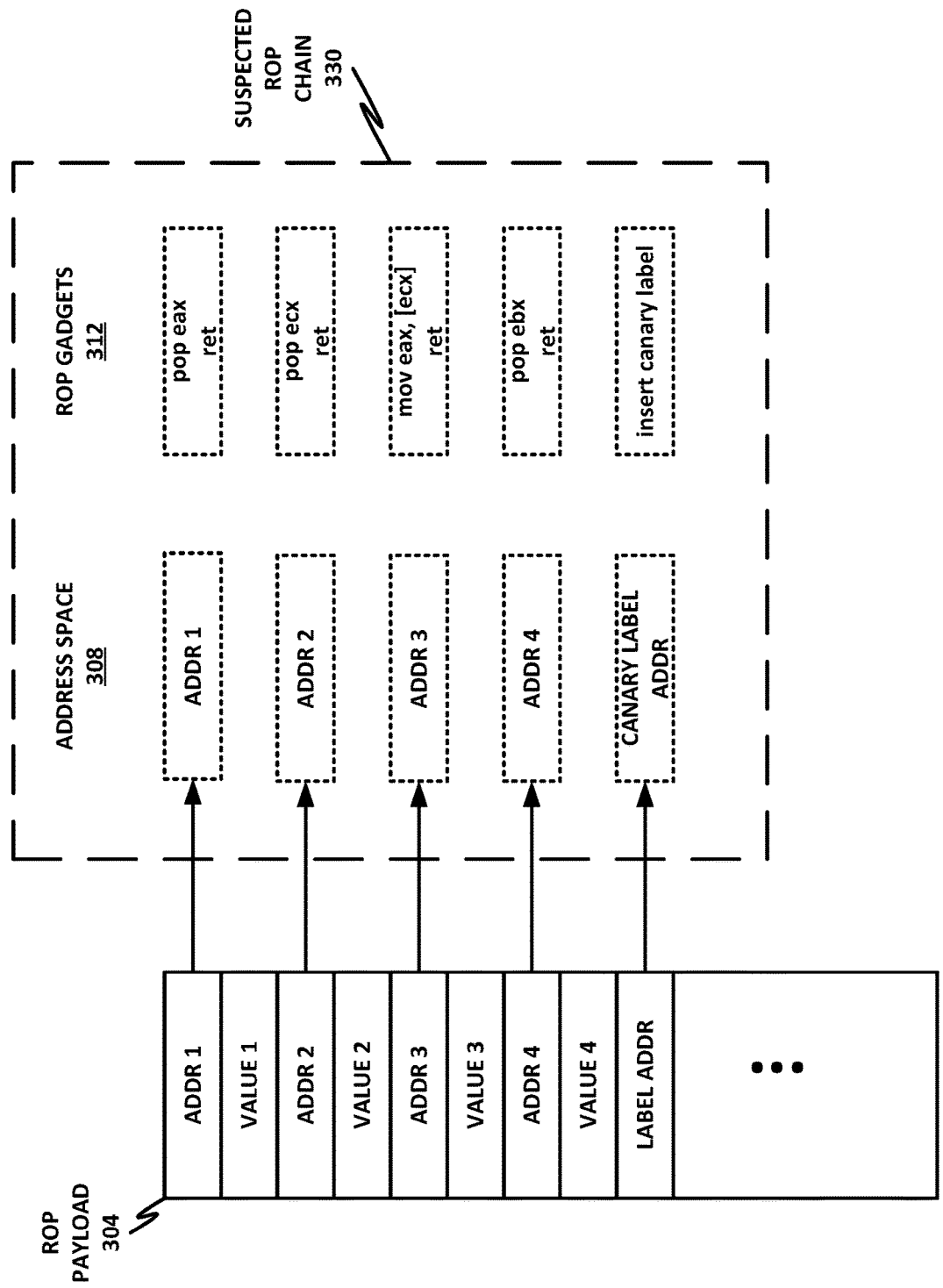
FIG. 3 is a block diagram of an example suspected ROP chain attacking an address space.

FIG. 3 is a block diagram of an example suspected ROP chain 330 attacking address space 308. As before, an ROP payload 304 includes a number of addresses and values, and these may be configured to access ROP gadgets 312. If suspected ROP chain 330 is in fact a true ROP attack, and one well written so that it executes successfully, then the full chain will execute to completion.

As before, ROP payload 304 includes four addresses and three values. Specifically, gadget 1 pops value 1 to eax. Gadget 2 pops value 2 to ecx. Gadget 3 loads the value from the memory location pointed to by value 2 (in ecx) to eax. Gadget 4 pops value 4 to ebx. As before, each gadget ends with a return instruction that transfers the control flow to the next gadget via ROP payload 304. In this case, a test is provided to see whether suspected ROP chain 330 is, in fact, a successful ROP attack. A label address is used along with an insert label instruction. The insert label instruction may be a new instruction provided in the CPU architecture, or it may be encoded in microcode, in firmware, or in software as is appropriate to the architecture of a particular embodiment.

In this case, suspected ROP chain 330 is deemed a payload under test. In that case, an extra item is added to the end of the payload as an ROP "canary in the coal mine." The inserted canary is an address pointing to a label gadget. If the canary instruction is reached, the label gadget is loaded into cache as a measurable result through the cache-based side channel. The label address, or canary, may be any dummy code that is isolated from executing code.

In short, if the dummy code or instruction (i.e., canary) is reached, then it can be inferred that the suspected ROP chain executed through and reached its end. In other words, in this example, all four instructions in the suspected ROP chain executed through, and the canary instruction was reached. Note that four instructions are shown here for purposes of illustration, but in fact, an ROP attack may (and usually does) include many more instructions, such as hundreds, thousands, or millions of instructions.

On the other hand, if for example the execution chain breaks between address 3 and address 4 (or at any other place in the chain), then the canary instruction is never reached. In that case, it can be inferred that suspected ROP chain 330 is not a true ROP exploit, or at least, that if it is an attempted ROP attack, it is not well-executed or successful.

Compared to traditional dynamic code analysis, based on shell code detection mechanisms that run the gadgets in an emulator, this method provides a detection mechanism that can be run within the existing program flow.

FIGS. 4a-4d illustrate an example code flow 400, including an example of speculative execution. As is common in a modern microprocessor, the processor includes an instruction prefetch mechanism. This mechanism fetches one or more future instructions and loads them into an execution pipeline so that instructions can be executed sequentially without waiting for a new fetch after each cycle. The processor also pre-fills the cache with cache lines that include data and instructions that are expected to be executed next. Note that "cache" is spoken of here as a monolithic structure, while in actual practice, cache may include various sizes and levels.

So long as control flow 400 includes only linear sequences of instructions, the core can with perfect accuracy prefetch instructions and completely fill the pipeline so that execution is never disrupted.

Figure 4B:
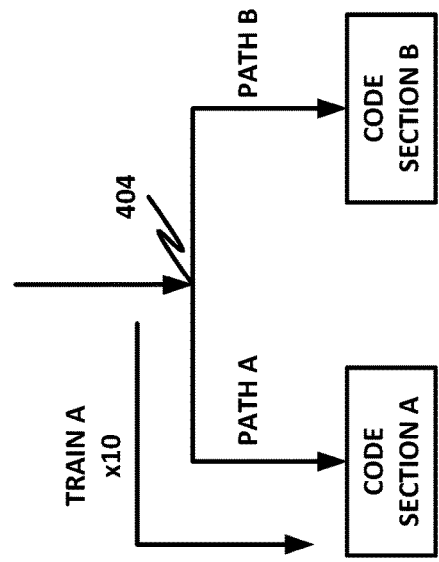
FIGS. 4a-4d illustrates an example code flow.
Figure 4D:
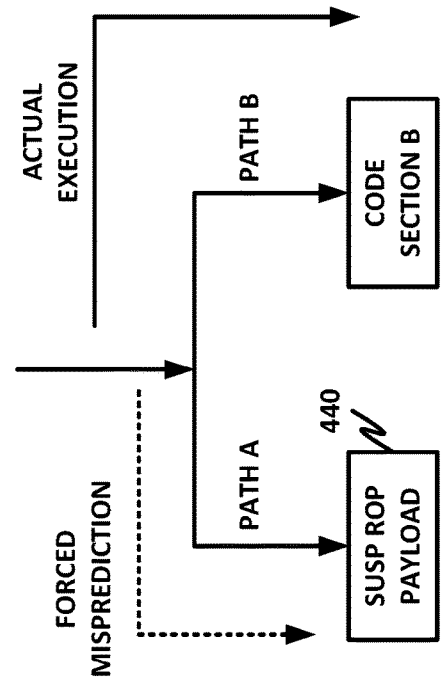
Figure 4A:
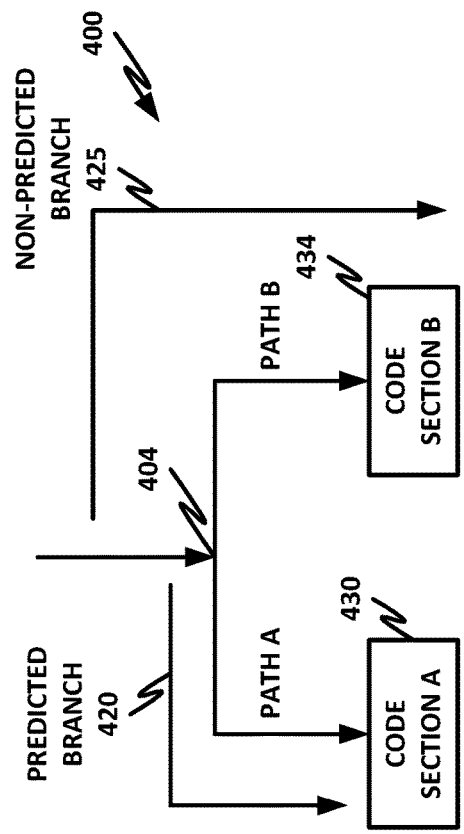

However, in the example of FIG. 4a (as in the case of most real-world examples), code flow 400 includes a branching instruction 404. If branching instruction 404 is a conditional branch, then the core cannot know with perfect certainty which branch will be taken on the current iteration. For example, flow could follow path A to code section A 430, or it could follow path B to code section B 434.

A naïve solution to this is to simply allow the program to flow through to the branching instruction, and then wait for the condition to be calculated before filling the pipeline and the cache. But in nontrivial programs with large loops that are executed many times over, this naïve mechanism would result in a large number of pipeline stalls and cache misses. This would seriously impact the overall perceived performance of the processor, regardless of its actual clock speed, and may be deemed unacceptable to modern users who expect their high-end, expensive computers to be performant and responsive.

Thus, even relatively simple microprocessors include branch prediction logic that can predict with greater than 90% accuracy, and high-end processors can predict with greater than 99% accuracy. The processor is therefore likely to correctly predict which branch will be taken at branching instruction 404. There are many methods for performing branch prediction, some more complex than others.

Thus, modern microprocessors predict a predicted branch 420, which is the branch expected to be taken at branching instruction 404. The core pre-fills the cache and pipeline with instructions and data from predicted branch 420, and so long as the prediction is correct, execution continues with little to no disruption of the process.

But between ~1% and ~10% of the time, predicted branch 420 is the wrong branch. Branching instruction 404 results instead in flow proceeding to non-predicted branch 425. This is referred to as a "missed prediction." By design, a missed prediction has no architectural effect on the state of the processor. In the case of the missed prediction, the mispredicted instruction or instructions of code section A 430 are "backed out," and program flow proceeds along non-predicted branch 425 to code section B 434.

A necessary side effect of this speculative code execution is that the cache is filled with data that would have been used by code section A 430. If it were not so, then the branch prediction would be practically useless, as even a successful prediction would require fetching the appropriate data from main memory, which may be one to four orders of magnitude slower in a modern processor than fetching the data from any level of cache.

Embodiments of the ROP detection mechanism of the present specification use this cache-filling side effect to detect the presence of ROP chains that execute through to a canary instruction.

In the x86 and related microarchitectures provided by Intel®, the return stack buffer (RSB) stores return addresses associated with call and return instructions. Other architectures use other stack return buffers, or similar buffers, for a similar result. The values stored in the RSB (or equivalent) are used in speculative code execution to improve performance when the architectural return address is not immediately available.

In an embodiment of the present specification, the RSB (or equivalent) may be populated with the address of a suspected ROP payload under test. For example, in the illustration of FIG. 3, the RSB may be pointed to address 1 of suspected ROP payload 304. If ROP gadgets 312 do, indeed, constitute a properly-formed ROP chain, then execution will flow through the four instructions listed, and finally terminate at the label or canary instruction. The executing core may then be forced into a missed prediction, using a known method for forcing a missed prediction.

One known method for forcing a missed prediction, as shown in FIG. 4b by way of illustrative and nonlimiting example, is a process known as "training." In an embodiment, training may include creating a second program to share the memory region. The missed prediction path may be assigned as the correct path in the second program, which may be run multiple times to train the process until it follows the controlled path. In this illustration, path A is "trained" ten times.

Figure 4C:
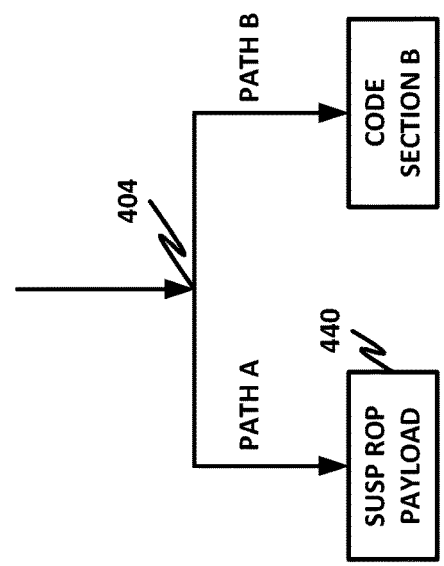

As illustrated in FIG. 4c, the suspected ROP payload that was previously identified is loaded into code section 440. Thus, if code section 440 is executed, then the suspected ROP payload is executed.

However, as illustrated in FIG. 4d, suspected ROP payload 440 is not permitted to execute normally. Rather, the RSB (or similar register or buffer) is pointed to suspected ROP payload 440, which is deliberately a missed prediction. The actual code of the executing program sits in code section B 434. The processor then forces a missed prediction so that suspected ROP payload 440 is executed. But by design, because this is a missed prediction path, it will have no permanent effect on the architectural state of the processor, except to fill data into the cache.

The chain of gadgets may then be speculatively executed in the window, to determine if it is, in fact, a successful ROP gadget chain. If the suspected ROP gadget chain reaches the canary instruction inserted at the end of the chain, then it may be inferred that the suspected ROP payload is, in fact, a successful and malicious ROP payload. Appropriate remedial action may then be taken, including, for example, quarantining the offending code, sandboxing the offending code, removing the offending code, notifying an end user, notifying a security architecture, and/or notifying an enterprise security administrator.

Note that there are many ways to create a speculative execution path that will not be committed to architecture. In this case, creating a forced branch misprediction is used as an illustrative example. Other methods may be used.

Another consideration is timing. If the forced missed prediction does not have time to fully execute before control returns to the main program flow, then the chain will not reach the canary label, even if it is an actual ROP chain. It is therefore desirable in some embodiments to force latency to give the speculative branch time to fully execute through. For example, the speculative execution window may be increased by delaying the architectural branch target from being available. This may be accomplished, for example, by adding memory access latency (e.g., by evicting from cache, and then forcing or delaying a page walk). This may also be accomplished, in an example, by computing latency (e.g., by an arithmetic dependency), by processor resource latency (e.g., port contention), or any suitable combination of these approaches or any other approach for generating latency.

A check for whether the canary instruction was reached may, in some cases, be as simple as loading the address from memory. If the canary instruction executed, the memory location will have been loaded into cache. In that case, the location can be fetched on the order of 10 to low hundreds of cycles on a modern computing architecture. If the canary instruction was not reached, then the value will have to be loaded from main memory. Depending on the architecture, and the various levels of cache, loading from main memory may require between one and four orders of magnitude more cycles than fetching from cache. For example, in a modern Intel® architecture, a value fetched from main memory may require on the order of hundreds to low thousands of cycles, versus tens to low hundreds of cycles for a value fetched from various levels of cache.

Because the gadgets are run, according to the presently disclosed method, on a mispredicted path, all of the consequences of the speculative code execution are revoked before committing at the hardware level. In other words, from the hardware perspective, it is as though the instructions were never executed at the software level. The only persistent result is that the label gadget gets loaded into cache if it is reached. As described above, this can easily be measured using a cache-based timing side channel. Therefore, the canary instruction can serve as an indicator of whether the ROP chain executed successfully. If it did, then the input data can be flagged as an ROP payload, because the probability is extremely (even infinitesimally) low that benign data results in execution of a successful gadget chain. Note that, in response to the well-publicized Spectre and Meltdown side channel cache exploits, patches have been applied at the hardware and software level to mitigate the attacks. The technique disclosed herein can, however, be used even after patches for recent speculative side channel issues. This is possible because the patches do not prevent creating speculative paths within the same security context. Indeed, preventing such speculative paths would completely eviscerate a fundamental aspect of contemporary microprocessor design. Furthermore, many of the recent patches are optionally controlled by software. So even in a case where a side channel patch would interfere with the current method, it may be disabled for the intended flows only, without affecting overall system security.

Figure 5:
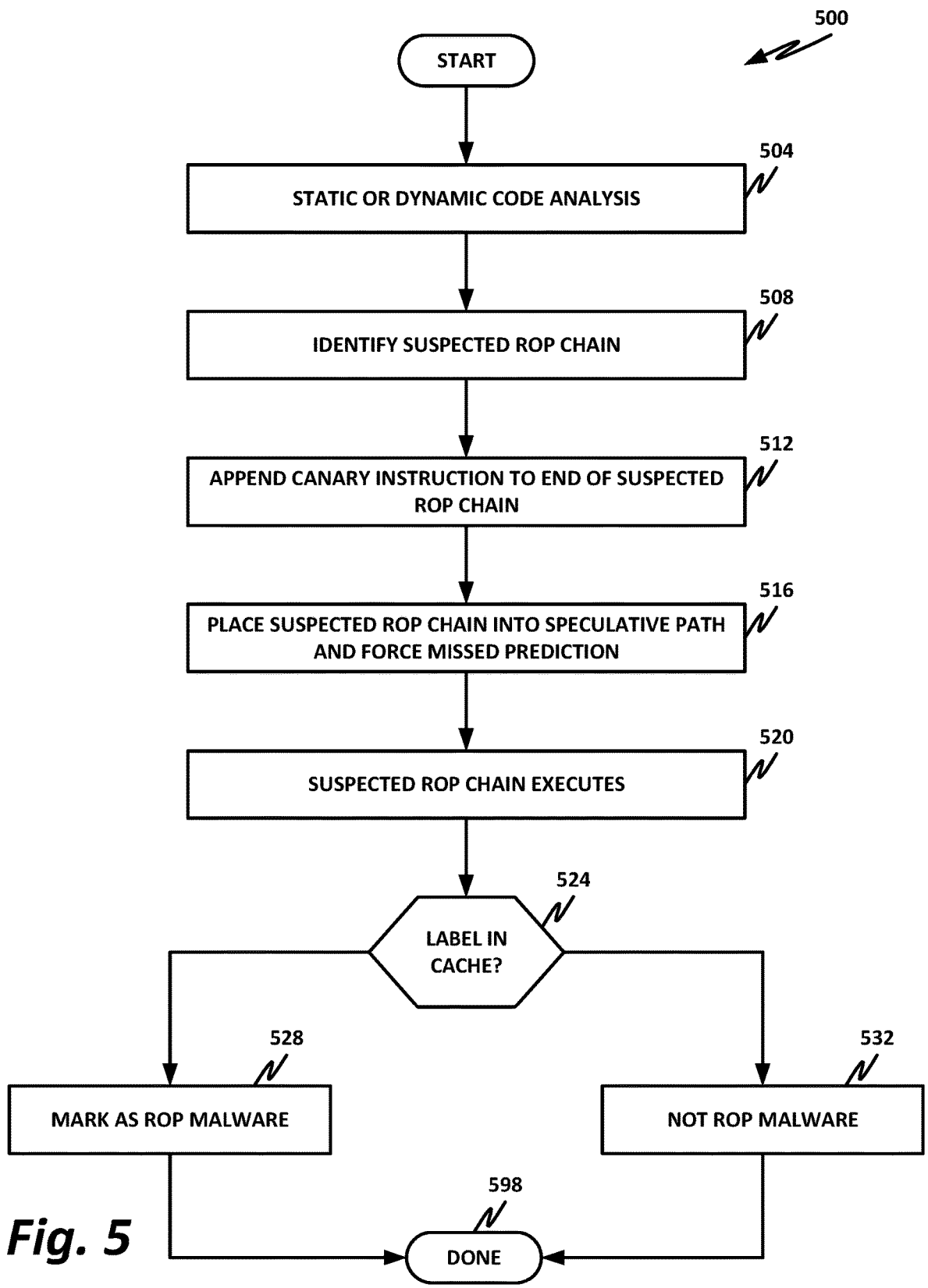
FIG. 5 is a flowchart of a method of performing ROP detection and mitigation.

FIG. 5 is a flowchart of a method 500 of performing ROP detection and mitigation. Starting in block 504, the system may use static or dynamic code analysis, or other known methods, to analyze objects, code flows, or other byte streams to determine whether the objects represent a potential ROP gadget chain. Not shown in flowchart 500 is that, if this analysis results in a determination that the object is not a candidate for an ROP gadget chain, then program flow and execution can proceed normally.

In block 508, the system identifies a suspected ROP chain. In block 512, the system may define a gadget as an ROP identification label, and append the appropriate instruction to insert the label at the end of the suspected ROP chain.

For the payload under test, the system may find all potential valid addresses that may form an ROP chain. In some cases, a single payload may have multiple suspicious chains. In that case, as necessary, the system may identify all suspicious chains, and subject all suspicious chains to analysis. Finally, the system hooks the last return address in the payload to the canary gadget.

In block 516, before speculatively executing the suspected ROP chain, the system may first ensure that the address pointed to by the canary instruction is not in cache. For example, a cache flash may be used to ensure that the address is not already in cache. This can be used to ensure that if the address is in cache after execution of the suspected ROP chain, it is because the canary instruction was executed at the end of the chain. In the example of FIG. 5, one suspected ROP gadget chain may be placed in a speculative execution path. This could be effected, for example, by populating the RSB (or a corresponding register) with the address of the suspected ROP chain. In other cases, other methods could also be used to place the suspected ROP chain into the speculative execution path.

The system may create the speculative execution path with enough speculation window to allow the suspected ROP chain to successfully execute. This can be done using any suitable method, including the methods discussed above. Further as discussed above, the suspected ROP chain under test may be placed on a mispredicted path. The system may then trigger speculative code execution of the suspected ROP chain.

In block 520, the suspected ROP chain is permitted to execute in the speculative execution path. Depending on whether the suspected chain is, in fact, a valid ROP chain, this may result in only one or a few instructions being executed in a chain, or it may result in the entire chain being executed.

In decision block 524, after speculative execution, the system may use a timing side channel to check whether the canary (e.g., label gadget) was brought into cache. If the label was brought into cache, that means the canary instruction was reached by the chain, and it may be inferred that the full chain was executed.

Thus, if the canary label is found in cache in decision block 524, then in block 528, the system may mark the suspected ROP payload as malicious, or at least as suspected malicious code. Once the label is so marked, appropriate remedial action may be taken, and in block 598 the method is done. This could include, for example, quarantining the suspected code and operating it in an emulated or sandboxed environment to perform more detailed static analysis of its effects. This could also include scrubbing the offending code from the device, quarantining or sandboxing the offending code, notifying an end user, notifying an enterprise security architecture, notifying an enterprise security administrator, or taking other remedial or prophylactic action.

Returning to decision block 524, if the canary label is not found in cache, then in block 532, it may be inferred that the suspected ROP chain is not an actual ROP chain, or at least if it is an attempted ROP attack, it is not a well-formed or successful one. In that case, the object may be marked as benign, and in block 598 the method is done. Depending on enterprise security policy and other security considerations, objects marked as benign may or may not be subjected to additional analysis. In some cases, the number of benign objects originally identified as potential ROP gadget chains may be much greater than the number of true ROP gadget chains identified. In other words, the initial "gatekeeper" function that identifies suspected ROP gadget chains may have a relatively large number of false positives. This may be acceptable, because a false positive does not necessarily mean that the object is treated as malware. It may simply mean that the object becomes an object under analysis as a suspected ROP gadget chain. In those cases, it may be more practical when an object does not meet the test described herein (e.g., if the canary label is not found in cache), that the object is treated as benign unless or until additional evidence indicates that it is malicious. In other examples, other balances may be struck in how to treat objects that do or do not pass the test described herein.

Figure 6:
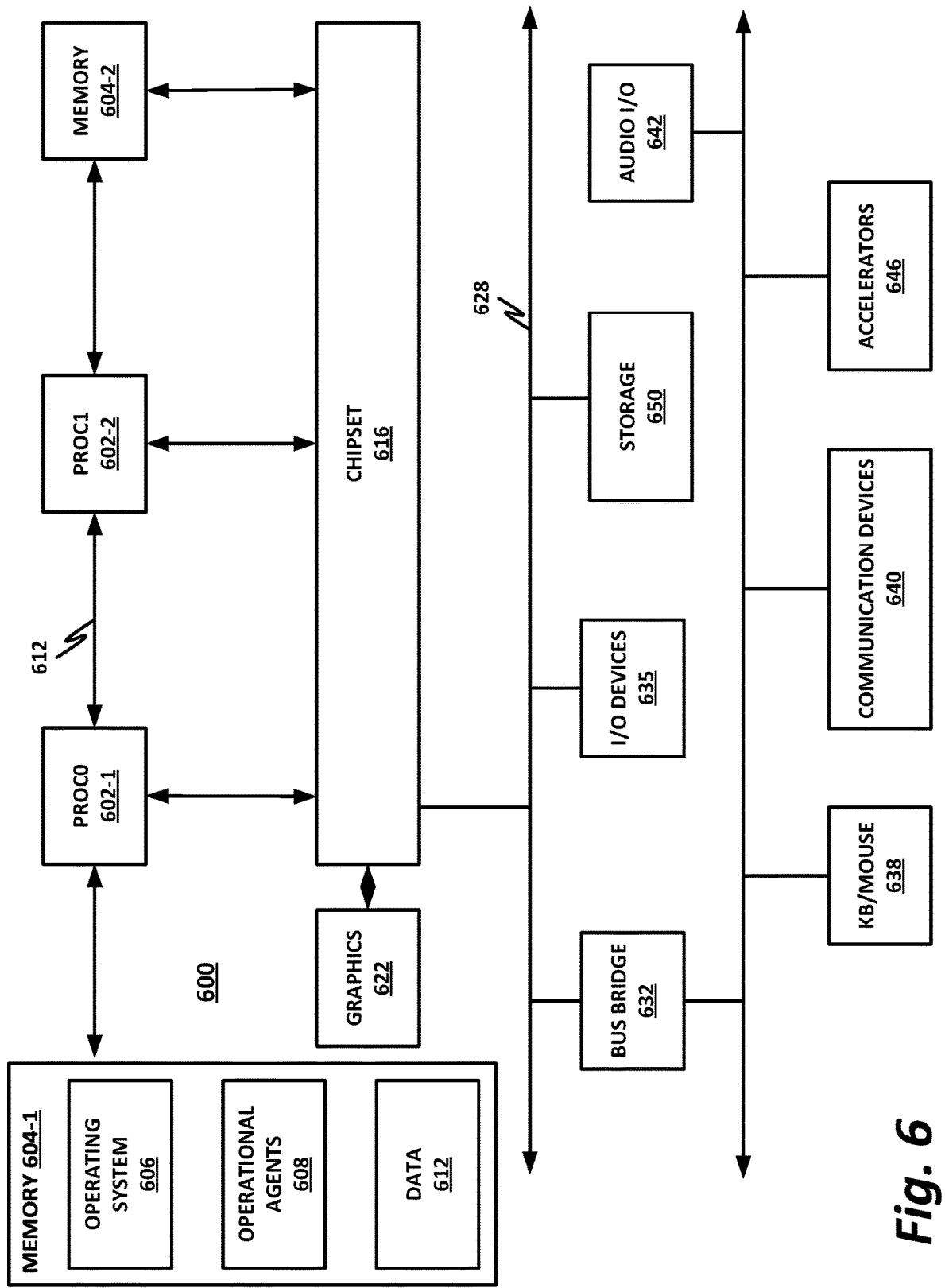
FIG. 6 is a block diagram of an example hardware platform.

FIG. 6 is a block diagram of an example hardware platform 600. Hardware platform 600 may be configured to provide mitigation of return-oriented programming exploits, as disclosed in the present specification.

Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 600, even though they may be scattered across a data center, or even located in different data centers.

Hardware platform 600 is configured to provide a computing device. In various embodiments, a "computing device" may be or comprise, by way of nonlimiting example, a computer, workstation, server, mainframe, virtual machine (whether emulated or on a "bare-metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, Internet protocol (IP) telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 600 is arranged in a point-to-point (PtP) configuration. This PtP configuration is popular for personal computer (PC) and server-type devices, although it is not so limited, and any other bus type may be used.

Hardware platform 600 is an example of a platform that may be used to implement embodiments of the teachings of this specification. For example, instructions could be stored in storage 650. Instructions could also be transmitted to the hardware platform in an ethereal form, such as via network interface 648, or retrieved from another source via any suitable interconnect. Once received (from any source), the instructions may be loaded into memory 604, and may then be executed by one or more processor 602 to provide elements such as an operating system 606, operational agents 608, or data 612.

Hardware platform 600 may include several processors 602. For simplicity and clarity, only processors PROC0 602-1 and PROC1 602-2 are shown. Additional processors (such as 2, 4, 8, 16, 24, 32, 64, or 128 processors) may be provided as necessary, while in other embodiments, only one processor may be provided. Processors may have any number of cores, such as 1, 2, 4, 8, 16, 24, 32, 64, or 128 cores.

Processors 602 may be any type of processor and may communicatively couple to chipset 616 via, for example, PtP interfaces. Chipset 616 may also exchange data with other elements, such as a high performance graphics adapter 622. In alternative embodiments, any or all of the PtP links illustrated in FIG. 6 could be implemented as any type of bus, or other configuration rather than a PtP link. Each chipset may support any suitable number of CPUs 602. A chipset 616 (which may be a chipset, uncore, Northbridge, Southbridge, or other suitable logic and circuitry) may also include one or more controllers to couple other components to one or more CPUs.

Two memories, 604-1 and 604-2 are shown, connected to PROC0 602-1 and PROC1 602-2, respectively. As an example, each processor is shown connected to its memory in a direct memory access (DMA) configuration, though other memory architectures are possible, including ones in which memory 604 communicates with processor 610 via a bus. For example, some memories may be connected via a system bus, or in a data center, memory may be accessible in a remote DMA (RDMA) configuration.

Memory 604 may include any form of volatile or nonvolatile memory including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel® Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 604 may be used for short, medium, and/or long-term storage. Memory 604 may store any suitable data or information utilized by platform logic. In some embodiments, memory 604 may also comprise storage for instructions that may be executed by the cores of CPUs 602 or other processing elements (e.g., logic resident on chipsets 616) to provide functionality.

In certain embodiments, memory 604 may comprise a relatively low-latency volatile main memory, while storage 650 may comprise a relatively higher-latency nonvolatile memory. However, memory 604 and storage 650 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 604 and storage 650, for example, in a single physical memory device, and in other cases, memory 604 and/or storage 650 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 622 may be configured to provide a human-readable visual output, such as a command-line interface (CLI) or graphical desktop such as Microsoft Windows, Apple OSX desktop, or a Unix/Linux X Window System-based desktop. Graphics adapter 622 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 622 may include a hardware graphics card, which may have its own memory and its own graphics processing unit (GPU).

Chipset 616 may be in communication with a bus 628 via an interface circuit. Bus 628 may have one or more devices that communicate over it, such as a bus bridge 632, I/O devices 635, network interface 648, accelerators 646, communication devices 640, and a keyboard and/or mouse 638, by way of nonlimiting example. In general terms, the elements of hardware platform 600 may be coupled together in any suitable manner. For example, a bus may couple any of the components together. A bus may include any known interconnect, such as a multidrop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 640 can broadly include any communication not covered by network interface 648 and the various I/O devices described herein. This may include, for example, various universal serial bus (USB), FireWire, Lightning, or other serial or parallel devices that provide communications.

I/O Devices 635 may be configured to interface with any auxiliary device that connects to hardware platform 600 but that is not necessarily a part of the core architecture of hardware platform 600. A peripheral may be operable to provide extended functionality to hardware platform 600, and may or may not be wholly dependent on hardware platform 600. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 642 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 632 may be in communication with other devices such as a keyboard/mouse 638 (or other input devices such as a touch screen, trackball, etc.), communication devices 640 (such as modems, network interface devices, peripheral interfaces such as PCI or PCIe, or other types of communication devices that may communicate through a network), audio I/O devices 642, a data storage device 644, and/or accelerators 646. In alternative embodiments, any portions of the bus architectures could be implemented with one or more PtP links.

Operating system 606 may be, for example, Microsoft Windows, Linux, UNIX, Mac OS X, iOS, MS-DOS, or an embedded or real-time operating system (including embedded or real-time flavors of the foregoing). In some embodiments, a hardware platform 600 may function as a host platform for one or more guest systems that invoke application (e.g., operational agents 608).

Operational agents 608 may include a security agent configured to carry out the ROP detection method disclosed in this specification. Operational agents 608 may further include one or more computing engines that may include one or more non-transitory computer-readable mediums having stored thereon executable instructions operable to instruct a processor to provide operational functions. At an appropriate time, such as upon booting hardware platform 600 or upon a command from operating system 606 or a user or security administrator, processor 602 may retrieve a copy of the operational agent (or software portions thereof) from storage 650 and load it into memory 604. Processor 610 may then iteratively execute the instructions of operational agents 608 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

Where elements of an engine are embodied in software, computer program instructions may be implemented in programming languages, such as an object code, an assembly language, or a high level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

Network interface 648 may be provided to communicatively couple hardware platform 600 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fibre Channel, InfiniBand, Wi-Fi, or other suitable standard. Intel® Omni-Path™ Architecture (OPA), TrueScale™, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an Internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. Network interface 648 may include one or more physical ports that may couple to a cable (e.g., an Ethernet cable, other cable, or waveguide).

In some cases, some or all of the components of hardware platform 600 may be virtualized, in particular the processor (s) and memory. For example, a virtualized environment may run on OS 606, or OS 606 could be replaced with a hypervisor or virtual machine manager. In this configuration, a virtual machine running on hardware platform 600 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 6 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Certain of the FIGURES below detail example architectures and systems to implement embodiments of the above. In some embodiments, one or more hardware components and/or instructions described above are emulated as detailed below, or implemented as software modules.

In certain examples, instruction(s) may be embodied in a "generic vector-friendly instruction format," which is detailed below. In other embodiments, another instruction format is used. The description below of the write mask registers, various data transformations (swizzle, broadcast, etc.), addressing, etc. is generally applicable to the description of the embodiments of the instruction(s) above. Additionally, example systems, architectures, and pipelines are detailed below. Embodiments of the instruction(s) above may be executed on those systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats).

For example, the instruction templates of a given instruction format may be defined to have different subsets of the instruction format's fields (the included fields are typically in the same order, but at least some have different bit positions because there are fewer fields included) and/or defined to have a given field interpreted differently. Thus, each instruction of an ISA is expressed using a given instruction format (and, if defined, in a given one of the instruction templates of that instruction format) and includes fields for specifying the operation and the operands.

In one embodiment, an example ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

A set of SIMD extensions referred to as the advanced vector extensions (AVXs) (AVX1 and AVX2), and using the vector extensions (VEX) coding scheme has been released and/or published (e.g., see Intel® 64 and IA-32 Architectures Software Developer's Manual, September 2014; and see Intel® Advanced Vector Extensions Programming Reference, October 2014).

Example Instruction Formats

Embodiments of the instruction(s) described herein may be embodied in different formats. Additionally, example systems, architectures, and pipelines are detailed below. Embodiments of the instruction(s) may be executed on such systems, architectures, and pipelines, but are not limited to those detailed.

Generic Vector-Friendly Instruction Format

A vector-friendly instruction format is an instruction format that is suited for vector instructions (e.g., there are certain fields specific to vector operations). While embodiments are described in which both vector and scalar operations are supported through the vector-friendly instruction format, alternative embodiments use only vector operations through the vector-friendly instruction format.

Figure 7A:
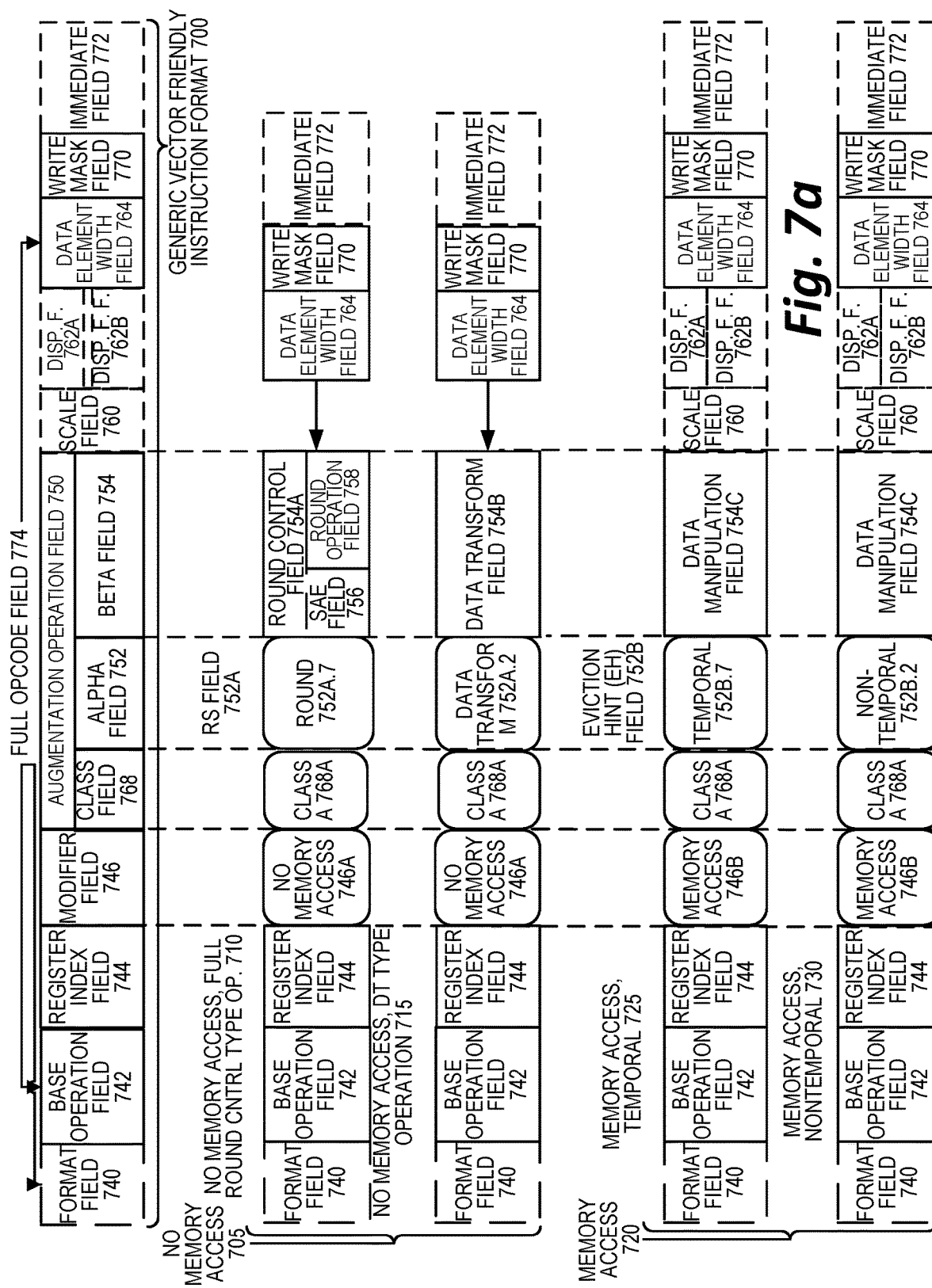

FIGS. 7a-7b are block diagrams illustrating a generic vector-friendly instruction format and instruction templates thereof. The examples of FIGS. 7a-7b may be configured to provide mitigation of return-oriented programming exploits, as disclosed in the present specification.

FIG. 7a is a block diagram illustrating a generic vector-friendly instruction format and class A instruction templates thereof according to embodiments of the specification; while FIG. 7b is a block diagram illustrating the generic vector-friendly instruction format and class B instruction templates thereof according to embodiments of the specification. Specifically, a generic vector-friendly instruction format 700 for which are defined class A and class B instruction templates, both of which include no memory access 705 instruction templates and memory access 720 instruction templates. The term generic in the context of the vector-friendly instruction format refers to the instruction format not being tied to any specific instruction set.

Embodiments of the specification will be described in which the vector-friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 7a include: 1) within the no memory access 705 instruction templates there is shown a no memory access, full round control type operation 710 instruction template and a no memory access, data transform type operation 715 instruction template; and 2) within the memory access 720 instruction templates there is shown a memory access, temporal 725 instruction template and a memory access, nontemporal 730 instruction template. The class B instruction templates in FIG. 7b include: 1) within the no memory access 705 instruction templates there is shown a no memory access, write mask control, partial round control type operation 712 instruction template and a no memory access, write mask control, VSIZE type operation 717 instruction template; and 2) within the memory access 720 instruction templates there is shown a memory access, write mask control 727 instruction template.

The generic vector-friendly instruction format 700 includes the following fields listed below in the order illustrated in FIGS. 7a-7b.

Format field 740—a specific value (an instruction format identifier value) in this field uniquely identifies the vector-friendly instruction format, and thus occurrences of instructions in the vector-friendly instruction format in instruction streams. As such, this field is optional in the sense that it is not needed for an instruction set that has only the generic vector-friendly instruction format.

Base operation field 742—its content distinguishes different base operations.

Register index field 744—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or fewer sources and destination registers (e.g., may support up to two sources where one of these sources also acts as the destination, may support up to three sources where one of these sources also acts as the destination, or may support up to two sources and one destination).

Modifier field 746—its content distinguishes occurrences of instructions in the generic vector instruction format that specify memory access from those that do not; that is, between no memory access 705 instruction templates and memory access 720 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, fewer, or different ways to perform memory address calculations.

Augmentation operation field 750—its content distinguishes which one of a variety of different operations to be performed in addition to the base operation. This field is context specific. In one embodiment of the specification, this field is divided into a class field 768, an alpha field 752, and a beta field 754. The augmentation operation field 750 allows common groups of operations to be performed in a single instruction rather than two, three, or four instructions.

Scale field 760—its content allows for the scaling of the index field's content for memory address generation (e.g., for address generation that uses $2^{scale}*index+base$).

Displacement Field 762A—its content is used as part of memory address generation (e.g., for address generation that uses $2^{scale}*index+base+displacement$).

Displacement Factor Field 762B (note that the juxtaposition of displacement field 762A directly over displacement factor field 762B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operand's total size (N) in order to generate the final displacement to be used in calculating an effective address. The value of N is determined by the processor hardware at runtime based on the full opcode field 774 (described later herein) and the data manipulation field 754C. The displacement field 762A and the displacement factor field 762B are optional in the sense that they are not used for the no memory access 705 instruction templates and/or different embodiments may implement only one or none of the two.

Data element width field 764—its content distinguishes which one of a number of data element widths is to be used (in some embodiments, for all instructions; in other embodiments, for only some of the instructions). This field is optional in the sense that it is not needed if only one data element width is supported and/or data element widths are supported using some aspect of the opcodes.

Write mask field 770—its content controls, on a per data element position basis, whether that data element position in the destination vector operand reflects the result of the base operation and augmentation operation. Class A instruction templates support merging-write masking, while class B instruction templates support both merging and zeroing-write masking. When merging, vector masks allow any set of elements in the destination to be protected from updates during the execution of any operation (specified by the base operation and the augmentation operation)—in one embodiment, preserving the old value of each element of the destination where the corresponding mask bit has a 0. In contrast, when zeroing vector masks allow any set of elements in the destination to be zeroed during the execution of any operation (specified by the base operation and the augmentation operation), in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 770 allows for partial vector operations, including loads, stores, arithmetic, logical, etc. While embodiments of the specification are described in which the write mask field's 770 content selects one of a number of write mask registers that contains the write mask to be used (and thus the write mask field's 770 content indirectly identifies that masking to be performed), alternative embodiments instead or additionally allow the mask write field's 770 content to directly specify the masking to be performed.

Immediate field 772—its content allows for the specification of an immediate. This field is optional in the sense that is it not present in an implementation of the generic vector-friendly format that does not support immediate and it is not present in instructions that do not use an immediate.

Class field 768—its content distinguishes between different classes of instructions. With reference to FIGS. 7a-7b, the contents of this field select between class A and class B instructions. In FIGS. 7a-7b, rounded corner squares are used to indicate a specific value is present in a field (e.g., class A 768A and class B 768B for the class field 768 respectively in FIGS. 7a-7b).

Instruction Templates of Class A

In the case of the non-memory access 705 instruction templates of class A, the alpha field 752 is interpreted as an RS field 752A, whose content distinguishes which one of the different augmentation operation types are to be performed (e.g., round 752A.1 and data transform 752A.2 are respectively specified for the no memory access, round type operation 710 and the no memory access, data transform type operation 715 instruction templates), while the beta field 754 distinguishes which of the operations of the specified type is to be performed. In the no memory access 705 instruction templates, the scale field 760, the displacement field 762A, and the displacement scale filed 762B are not present.

No Memory Access Instruction Templates—Full Round Control Type Operation

In the no memory access full round control type operation 710 instruction template, the beta field 754 is interpreted as a round control field 754A, whose content provides static rounding. While in the described embodiments of the specification the round control field 754A includes a suppress all floating point exceptions (SAE) field 756 and a round operation control field 758, alternative embodiments may encode both these concepts into the same field or only have one or the other of these concepts/fields (e.g., may have only the round operation control field 758).

SAE field 756—its content distinguishes whether or not to disable the exception event reporting; when the SAE field's 756 content indicates suppression is enabled, a given instruction does not report any kind of floating point exception flag and does not raise any floating point exception handler.

Round operation control field 758—its content distinguishes which one of a group of rounding operations to perform (e.g., round-up, round-down, round-towards-zero and round-to-nearest). Thus, the round operation control field 758 allows for the changing of the rounding mode on a per instruction basis. In one embodiment of the specification where a processor includes a control register for specifying rounding modes, the round operation control field's 750 content overrides that register value.

No Memory Access Instruction Templates—Data Transform Type Operation

In the no memory access data transform type operation 715 instruction template, the beta field 754 is interpreted as a data transform field 754B, whose content distinguishes which one of a number of data transforms is to be performed (e.g., no data transform, swizzle, broadcast).

In the case of a memory access 720 instruction template of class A, the alpha field 752 is interpreted as an eviction hint field 752B, whose content distinguishes which one of the eviction hints is to be used (in FIG. 7a, temporal 752B.1 and nontemporal 752B.2 are respectively specified for the memory access, temporal 725 instruction template and the memory access, nontemporal 730 instruction template), while the beta field 754 is interpreted as a data manipulation field 754C, whose content distinguishes which one of a number of data manipulation operations (also known as primitives) is to be performed (e.g., no manipulation; broadcast; up conversion of a source; and down conversion of a destination). The memory access 720 instruction templates include the scale field 760, and optionally the displacement field 762A or the displacement scale field 762B.

Vector memory instructions perform vector loads from and vector stores to memory, with conversion support. As with regular vector instructions, vector memory instructions transfer data from/to memory in a data element-wise fashion, with the elements that are actually transferred as dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Nontemporal

Nontemporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 752 is interpreted as a write mask control (Z) field 752C, whose content distinguishes whether the write masking controlled by the write mask field 770 should be a merging or a zeroing.

In the case of the non-memory access 705 instruction templates of class B, part of the beta field 754 is interpreted as an RL field 757A, whose content distinguishes which one of the different augmentation operation types are to be performed (e.g., round 757A.1 and vector length (VSIZE) 757A.2 are respectively specified for the no memory access, write mask control, partial round control type operation 712 instruction template and the no memory access, write mask control, VSIZE type operation 717 instruction template), while the rest of the beta field 754 distinguishes which of the operations of the specified type is to be performed. In the no memory access 705 instruction templates, the scale field 760, the displacement field 762A, and the displacement scale field 762B are not present.

In the no memory access, write mask control, partial round control type operation 710 instruction template, the rest of the beta field 754 is interpreted as a round operation field 759A and exception event reporting is disabled (a given instruction does not report any kind of floating point exception flag and does not raise any floating point exception handler).

Round operation control field 759A—just as round operation control field 758, its content distinguishes which one of a group of rounding operations to perform (e.g., round-up, round-down, round-towards-zero and round-to-nearest). Thus, the round operation control field 759A allows for the changing of the rounding mode on a per instruction basis. In one embodiment of the specification where a processor includes a control register for specifying rounding modes, the round operation control field's 750 content overrides that register value.

In the no memory access, write mask control, VSIZE type operation 717 instruction template, the rest of the beta field 754 is interpreted as a vector length field 759B, whose content distinguishes which one of a number of data vector lengths is to be performed on (e.g., 128, 256, or 512 byte).

In the case of a memory access 720 instruction template of class B, part of the beta field 754 is interpreted as a broadcast field 757B, whose content distinguishes whether or not the broadcast type data manipulation operation is to be performed, while the rest of the beta field 754 is interpreted by the vector length field 759B. The memory access 720 instruction templates include the scale field 760, and optionally the displacement field 762A or the displacement scale field 762B.

With regard to the generic vector-friendly instruction format 700, a full opcode field 774 is shown including the format field 740, the base operation field 742, and the data element width field 764. While one embodiment is shown where the full opcode field 774 includes all of these fields, the full opcode field 774 includes less than all of these fields in embodiments that do not support all of them. The full opcode field 774 provides the operation code (opcode).

The augmentation operation field 750, the data element width field 764, and the write mask field 770 allow these features to be specified on a per instruction basis in the generic vector-friendly instruction format.

The combination of write mask field and data element width field create typed instructions in that they allow the mask to be applied based on different data element widths.

The various instruction templates found within class A and class B are beneficial in different situations. In some embodiments of the specification, different processors or different cores within a processor may support only class A, only class B, or both classes. For instance, a high performance general purpose out-of-order core intended for general purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the specification). Also, a single processor may include multiple cores, all of which support the same class or in which different cores support different classes. For instance, in a processor with separate graphics and general purpose cores, one of the graphics cores intended primarily for graphics and/or scientific computing may support only class A, while one or more of the general purpose cores may be high performance general purpose cores with out-of-order execution and register renaming intended for general purpose computing that supports only class B. Another processor that does not have a separate graphics core may include one more general purpose in-order or out-of-order cores that support both class A and class B. Of course, features from one class may also be implemented in the other class in different embodiments of the specification. Programs written in a high level language would be put (e.g., just in time compiled or statically compiled) into an variety of different executable forms, including: 1) a form having only instructions of the class or classes supported by the target processor for execution; or 2) a form having alternative routines written using different combinations of the instructions of all classes and having control flow code that selects the routines to execute based on the instructions supported by the processor which is currently executing the code.

Example Specific Vector-Friendly Instruction Format

FIGS. 8a-8d are block diagrams illustrating an example specific vector-friendly instruction format. The examples of FIGS. 8a-8d may be configured to provide mitigation of return-oriented programming exploits, as disclosed in the present specification.

Figure 8A:
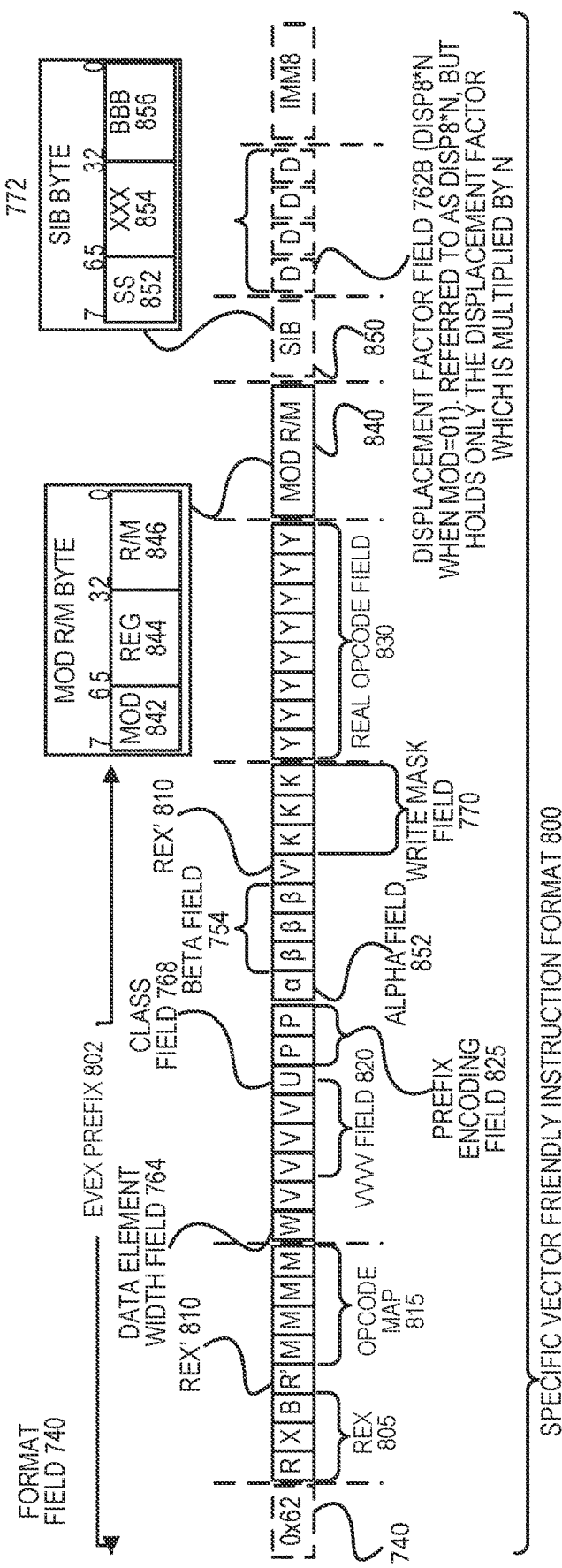
FIGS. 8a-8d are block diagrams illustrating an example specific vector-friendly instruction format.

FIG. 8a shows a specific vector-friendly instruction format 800 that is specific in the sense that it specifies the location, size, interpretation, and order of the fields, as well as values for some of those fields. The specific vector-friendly instruction format 800 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, Scale/Index/Base (SIB) field, displacement field, and immediate fields of the existing x86 instruction set with extensions. The fields from FIGS. 7a and 7b into which the fields from FIG. 8a map are illustrated.

It should be understood that, although embodiments of the specification are described with reference to the specific vector-friendly instruction format 800 in the context of the generic vector-friendly instruction format 700 for illustrative purposes, the present specification is not limited to the specific vector-friendly instruction format 800 except where claimed. For example, the generic vector-friendly instruction format 700 contemplates a variety of possible sizes for the various fields, while the specific vector-friendly instruction format 800 is shown as having fields of specific sizes. By way of particular example, while the data element width field 764 is illustrated as a one bit field in the specific vector-friendly instruction format 800, the present specification is not so limited (that is, the generic vector-friendly instruction format 700 contemplates other sizes of the data element width field 764).

The generic vector-friendly instruction format 700 includes the following fields listed below in the order illustrated in FIG. 8a.

EVEX Prefix (Bytes 0-3) 802—is encoded in a four-byte form.

Format Field 740 (EVEX Byte 0, bits [7:0])—the first byte (EVEX Byte 0) is the format field 740 and it contains 0x62 (the unique value used for distinguishing the vector-friendly instruction format in one embodiment).

The second through fourth bytes (EVEX Bytes 1-3) include a number of bit fields providing specific capability.

REX field 805 (EVEX Byte 1, bits [7-5])—consists of an EVEX.R bit field (EVEX Byte 1, bit [7]-R), EVEX.X bit field (EVEX byte 1, bit [6]-X), and 757BEX byte 1, bit[5]-B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 710—this is the first part of the REX' field 710 and is the EVEX.R' bit field (EVEX Byte 1, bit [4]-R') that is used to encode either the upper 16 or lower 16 of the extended 32 register set. In one embodiment, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; other embodiments do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 815 (EVEX byte 1, bits [3:0]-mmmm)—its content encodes an implied leading opcode byte (0F, 0F 38, or 0F 3).

Data element width field 764 (EVEX byte 2, bit [7]-W)—is represented by the notation EVEX.W. EVEX.W is used to define the granularity (size) of the datatype (either 32-bit data elements or 64-bit data elements).

EVEX.vvvv 820 (EVEX Byte 2, bits [6:3]-vvvv)—the role of EVEX.vvvv may include the following: 1) EVEX.vvvv encodes the first source register operand, specified in inverted (1 s complement) form and is valid for instructions with two or more source operands; 2) EVEX.vvvv encodes the destination register operand, specified in 1 s complement form for certain vector shifts; or 3) EVEX.vvvv does not encode any operand, the field is reserved and should contain 1111b. Thus, EVEX.vvvv field 820 encodes the four low-order bits of the first source register specifier stored in inverted (1 s complement) form. Depending on the instruction, an extra different EVEX bit field is used to extend the specifier size to 32 registers.

EVEX.U 768 Class field (EVEX byte 2, bit [2]-U)—if EVEX.U=0, it indicates class A or EVEX.U0; if EVEX.U=1, it indicates class B or EVEX.U1.

Prefix encoding field 825 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only two bits). In one embodiment, to support legacy SSE instructions that use an SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's programmable logic array (PLA) (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 752 (EVEX byte 3, bit [7]-EH; also known as EVEX.eh, EVEX.rs, EVEX.rl, EVEX.write mask control, and EVEX.n; also illustrated with α)—as previously described, this field is context specific.

Beta field 754 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 710—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 770 (EVEX byte 3, bits [2:0]-kkk)—its content specifies the index of a register in the write mask registers as previously described. In one embodiment, the specific value EVEX.kkk=000 has a special behavior implying no write mask is used for the particular instruction (this may be implemented in a variety of ways including the use of a write mask hardwired to all ones or hardware that bypasses the masking hardware).

Real opcode field 830 (Byte 4) is also known as the opcode byte. Part of the opcode is specified in this field.

MOD R/M Field 840 (Byte 5) includes MOD field 842, Reg field 844, and R/M field 846. As previously described, the MOD field's 842 content distinguishes between memory access and non-memory access operations. The role of Reg field 844 can be summarized to two situations: encoding either the destination register operand or a source register operand, or be treated as an opcode extension and not used to encode any instruction operand. The role of R/M field 846 may include the following: encoding the instruction operand that references a memory address, or encoding either the destination register operand or a source register operand.

SIB Byte (Byte 6)—as previously described, the scale field's 750 content is used for memory address generation. SIB.xxx 854 and SIB.bbb 856—the contents of these fields have been previously referred to with regard to the register indexes Xxxx and Bbbb.

Displacement field 762A (Bytes 7-10)—when MOD field 842 contains 10, bytes 7-10 are the displacement field 762A, and it works the same as the legacy 32-bit displacement (disp32) and works at byte granularity.

Displacement factor field 762B (Byte 7)—when MOD field 842 contains 01, byte 7 is the displacement factor field 762B. The location of this field is the same as that of the legacy x86 instruction set 8-bit displacement (disp8), which works at byte granularity. Since disp8 is sign extended, it can only address between 128 and 127-byte offsets; in terms of 64 byte cache lines, disp8 uses eight bits that can be set to only four really useful values −128, −64, 0, and 64; since a greater range is often needed, disp32 is used; however, disp32 requires 4 bytes. In contrast to disp8 and disp32, the displacement factor field 762B is a reinterpretation of disp8; when using displacement factor field 762B, the actual displacement is determined by the content of the displacement factor field multiplied by the size of the memory operand access (N). This type of displacement is referred to as disp8*N. This reduces the average instruction length (a single byte used for the displacement but with a much greater range). Such compressed displacement is based on the assumption that the effective displacement is a multiple of the granularity of the memory access, and hence, the redundant low-order bits of the address offset do not need to be encoded. In other words, the displacement factor field 762B substitutes the legacy x86 instruction set 8-bit displacement. Thus, the displacement factor field 762B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 772 operates as previously described.

Full Opcode Field

Figure 8B:
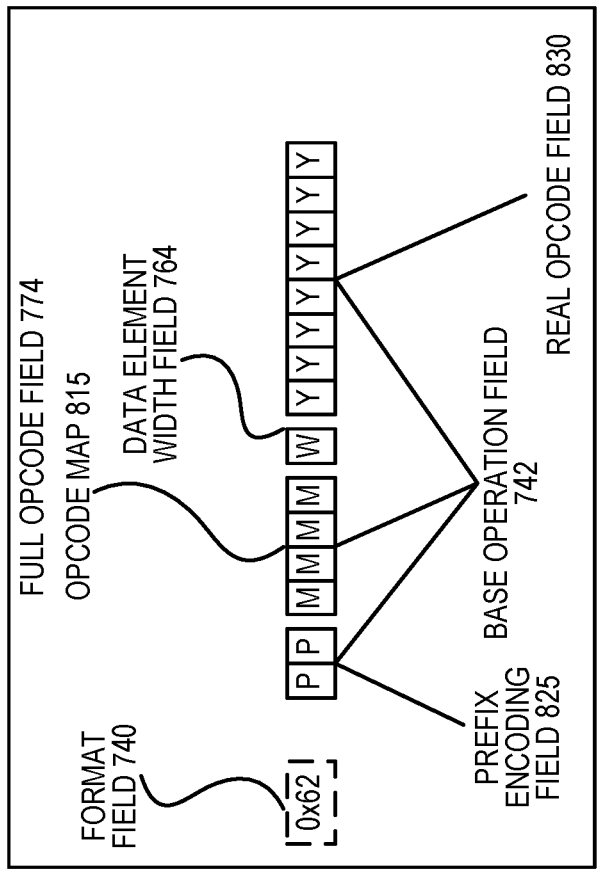

FIG. 8b is a block diagram illustrating the fields of the specific vector-friendly instruction format 800 that make up the full opcode field 774 according to one embodiment. Specifically, the full opcode field 774 includes the format field 740, the base operation field 742, and the data element width (W) field 764. The base operation field 742 includes the prefix encoding field 825, the opcode map field 815, and the real opcode field 830.

Register Index Field

Figure 8C:
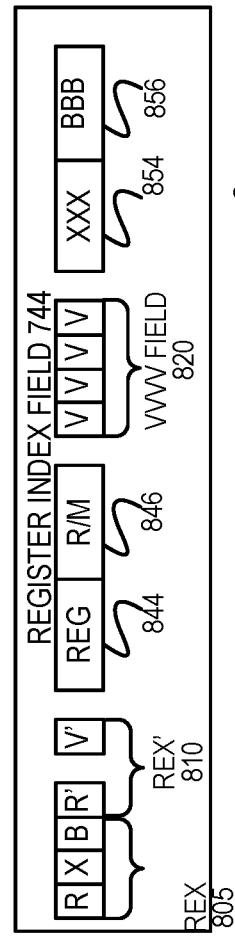

FIG. 8c is a block diagram illustrating the fields of the specific vector-friendly instruction format 800 that make up the register index field 744 according to one embodiment. Specifically, the register index field 744 includes the REX field 805, the REX' field 810, the MODR/M.reg field 844, the MODR/M.r/m field 846, the VVVV field 820, xxx field 854, and the bbb field 856.

Augmentation Operation Field

Figure 8D:
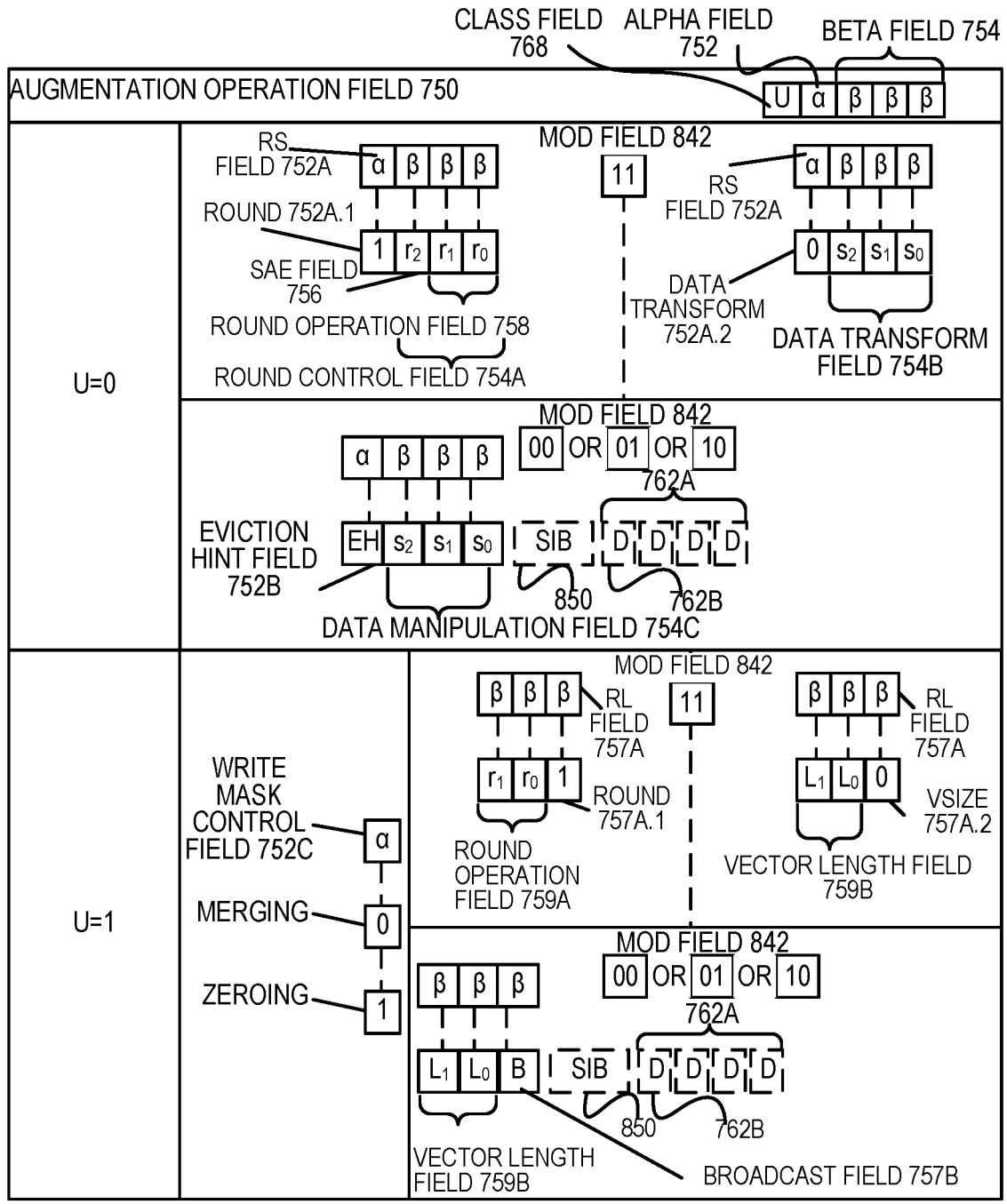

FIG. 8d is a block diagram illustrating the fields of the specific vector-friendly instruction format 800 that make up the augmentation operation field 750 according to one embodiment. When the class (U) field 768 contains 0, it signifies EVEX.U0 (class A 768A); when it contains 1, it signifies EVEX.U1 (class B 768B). When U=0 and the MOD field 842 contains 11 (signifying a no memory access operation), the alpha field 752 (EVEX byte 3, bit [7]-EH) is interpreted as the rs field 752A. When the rs field 752A contains a 1 (round 752A.1), the beta field 754 (EVEX byte 3, bits [6:4]-SSS) is interpreted as the round control field 754A. The round control field 754A includes a one bit SAE field 756 and a two bit round operation field 758. When the rs field 752A contains a 0 (data transform 752A.2), the beta field 754 (EVEX byte 3, bits [6:4]-SSS) is interpreted as a three bit data transform field 754B. When U=0 and the MOD field 842 contains 00, 01, or 10 (signifying a memory access operation), the alpha field 752 (EVEX byte 3, bit [7]-EH) is interpreted as the eviction hint (EH) field 752B and the beta field 754 (EVEX byte 3, bits [6:4]-SSS) is interpreted as a three bit data manipulation field 754C.

When U=1, the alpha field 752 (EVEX byte 3, bit [7]-EH) is interpreted as the write mask control (Z) field 752C. When U=1 and the MOD field 842 contains 11 (signifying a no memory access operation), part of the beta field 754 (EVEX byte 3, bit [4]-$S_0$) is interpreted as the RL field 757A; when it contains a 1 (round 757A.1) the rest of the beta field 754 (EVEX byte 3, bit [6-5]-$S_{2-1}$) is interpreted as the round operation field 759A, while when the RL field 757A contains a 0 (VSIZE 757.A2) the rest of the beta field 754 (EVEX byte 3, bit [6-5]-$S_{2-1}$) is interpreted as the vector length field 759B (EVEX byte 3, bit [6-5]-$L_{1-0}$). When U=1 and the MOD field 842 contains 00, 01, or 10 (signifying a memory access operation), the beta field 754 (EVEX byte 3, bits [6:4]-SSS) is interpreted as the vector length field 759B (EVEX byte 3, bit [6-5]-$L_{1-0}$) and the broadcast field 757B (EVEX byte 3, bit [4]-B).

Example Register Architecture

Figure 9:
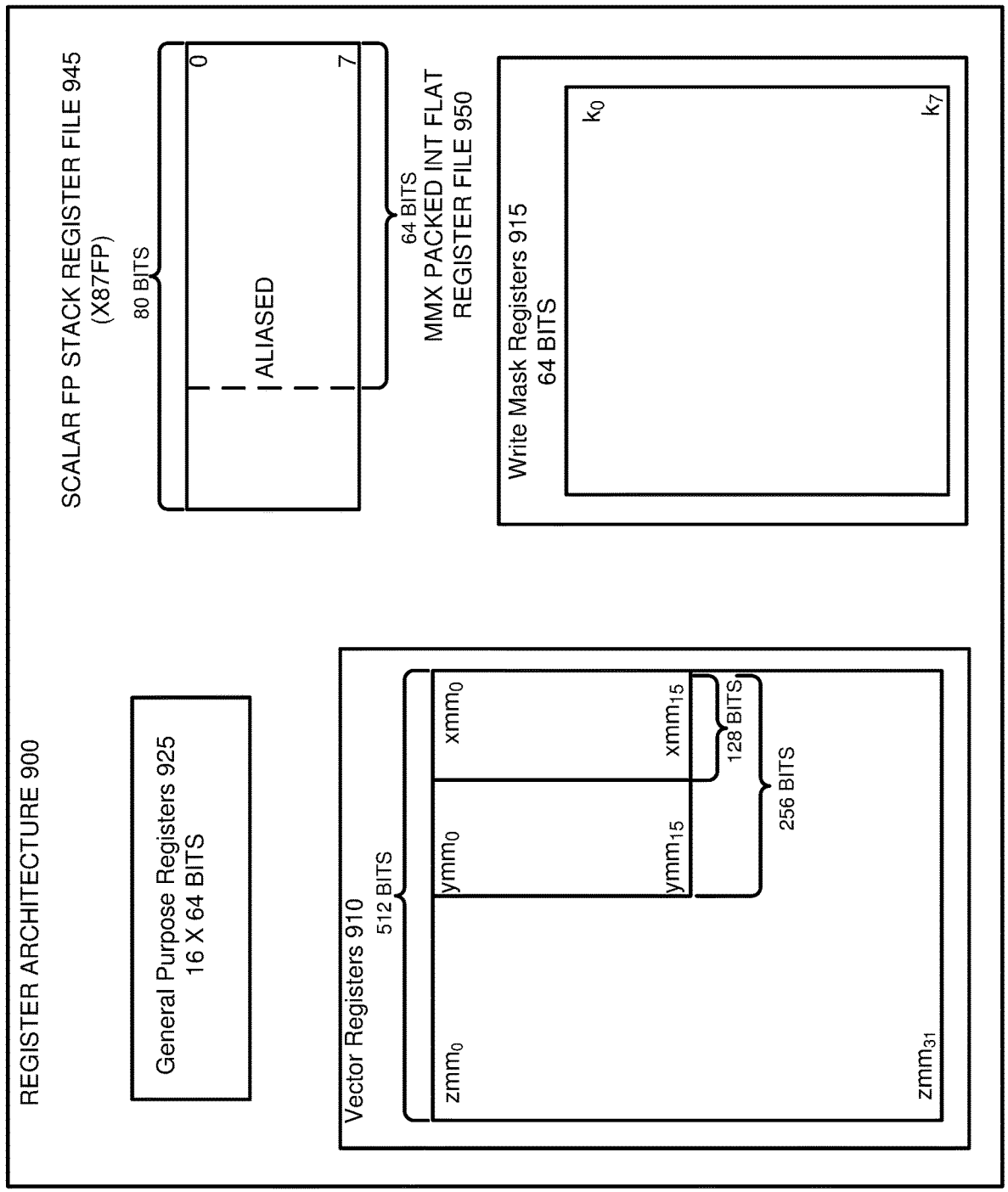
FIG. 9 is a block diagram of an example register architecture.

FIG. 9 is a block diagram of an example register architecture 900. The register architecture of FIG. 9 may be configured to provide mitigation of return-oriented programming exploits, as disclosed in the present specification.

In the embodiment illustrated, there are 32 vector registers 910 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector-friendly instruction format 800 operates on these overlaid register files as illustrated in the below tables.

| Adjustable Vector Length | Class | Operations | Registers |
|---|---|---|---|
| Instruction Templates that do not include the vector length field 759B | A (FIG. 7a; U = 0) | 710, 715, 725, 730 | zmm registers (the vector length is 64 byte) |
| | B (FIG. 7b; U = 1) | 712 | zmm registers (the vector length is 64 byte) |
| Instruction templates that do include the vector length field 759B | B (FIG. 7b; U = 1) | 717, 727 | zmm, ymm, or xmm registers (the vector length is 64 byte, 32 byte, or 16 byte) depending on the vector length field 759B |

In other words, the vector length field 759B selects between a maximum length and one or more other shorter lengths, where each such shorter length is half the length of the preceding length; and instruction templates without the vector length field 759B operate on the maximum vector length.

Further, in one embodiment, the class B instruction templates of the specific vector-friendly instruction format 800 operate on packed or scalar single/double-precision floating point data and packed or scalar integer data. Scalar operations are operations performed on the lowest order data element position in a zmm/ymm/xmm register; the higher order data element positions are either left the same as they were prior to the instruction or zeroed depending on the embodiment.

Write mask registers 915—in the embodiment illustrated, there are eight write mask registers (k0 through k7), each 64 bits in size. In an alternate embodiment, the write mask registers 915 are 16 bits in size. As previously described, in one embodiment, the vector mask register k0 cannot be used as a write mask; when the encoding that would normally indicate k0 is used for a write mask, it selects a hardwired write mask of 0xFFFF, effectively disabling write masking for that instruction.

General purpose registers 925—in the embodiment illustrated, there are sixteen 64-bit general purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 945, on which is aliased the MMX packed integer flat register file 950—in the embodiment illustrated, the x87 stack is an eight-element stack used to perform scalar floating point operations on 32/64/80-bit floating point data using the x87 instruction set extension; while the MMX registers are used to perform operations on 64-bit packed integer data, as well as to hold operands for some operations performed between the MMX and XMM registers.

Other embodiments may use wider or narrower registers. Additionally, other embodiments may use more, less, or different register files and registers.

Example Core Architectures, Processors, and Computer Architectures

Processor cores may be implemented in different ways, for different purposes, and in different processors. For instance, implementations of such cores may include: 1) a general purpose in-order core intended for general purpose computing; 2) a high performance general purpose out-of-order core intended for general purpose computing; 3) a special-purpose core intended primarily for graphics and/or scientific (throughput) computing. Implementations of different processors may include: 1) a CPU including one or more general purpose in-order cores intended for general purpose computing and/or one or more general purpose out-of-order cores intended for general purpose computing; and 2) a coprocessor including one or more special-purpose cores intended primarily for graphics and/or scientific throughput. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special-purpose logic, such as integrated graphics and/or scientific (throughput) logic, or as special-purpose cores); and 4) a system-on-a-chip that may include on the same die the described CPU (sometimes referred to as the application core(s) or application processor(s)), the above described coprocessor, and additional functionality. Example core architectures are described next, followed by descriptions of example processors and computer architectures.

Example Core Architectures

In-Order and Out-of-Order Core Block Diagram

Figures 10A, 10B:
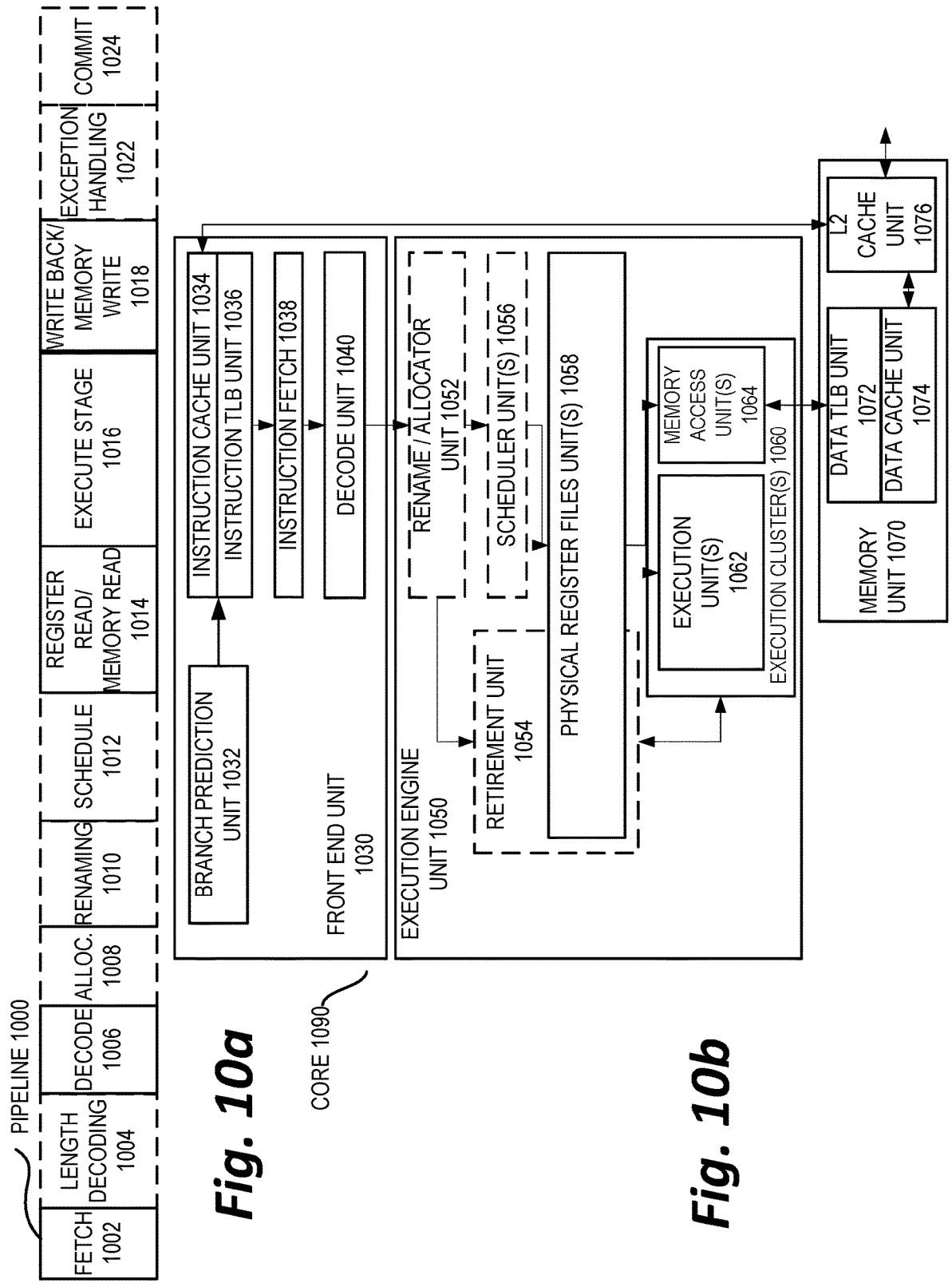
FIG. 10a is a block diagram illustrating both an example in-order pipeline and an example register renaming an out-of-order issue/execution pipeline.
FIG. 10b is a block diagram illustrating both an example of an in-order architecture core and an example register renaming an out-of-order issue/execution architecture core to be included in a processor.

FIG. 10*a* is a block diagram illustrating both an example in-order pipeline and an example register renaming, out-of-order issue/execution pipeline. FIG. 10*b* is a block diagram illustrating both an embodiment of an in-order architecture core and an example register renaming, out-of-order issue/execution architecture core to be included in a processor. The examples of FIGS. 10*a*-10*b* may be configured to provide mitigation of return-oriented programming exploits, as disclosed in the present specification.

The solid lined boxes in FIGS. 10*a*-10*b* illustrate the in-order pipeline and in-order core, while the optional addition of the dashed, lined boxes illustrates the register renaming, out-of-order issue/execution pipeline and core. Given that the in-order aspect is a subset of the out-of-order aspect, the out-of-order aspect will be described.

In FIG. 10*a*, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10*b* shows processor core 1090 including a front end unit 1030 coupled to an execution engine unit 1050, and both are coupled to a memory unit 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (or decoder) may decode instructions, and generate as an output one or more micro-operations, microcode entry points, microinstructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, PLAs, microcode read-only memories (ROMs), etc. In one embodiment, the core 1090 includes a microcode ROM or other medium that stores microcode for certain macroinstructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservation stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1058 comprises a vector registers unit, a write mask registers unit, and a scalar registers unit. These register units may provide architectural vector registers, vector mask registers, and general purpose registers. The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

By way of example, the register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1014; the execution cluster 1060 performs the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instruction sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1090 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Example In-Order Core Architecture

FIGS. 11*a*-11*b* illustrate a block diagram of a more specific example in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11*a* is a block diagram of a single processor core, along with its connection to the on-die interconnect network 1102 and with its local subset of the Level 2 (L2) cache 1104, according to one or more embodiments. The processor core of FIG. 11*a* may be configured to provide mitigation of return-oriented programming exploits, as disclosed in the present specification.

In one embodiment, an instruction decoder 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 1112 and vector registers 1114) and data transferred between them is written to memory and then read back in from a level 1 (L1) cache 1106, other embodiments may use a different approach (e.g., use a single register set or include a communication path that allows data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11b is an expanded view of part of the processor core in FIG. 11a according to embodiments of the specification. FIG. 11b includes an L1 data cache 1106A, part of the L1 cache 1104, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B, and replication with replication unit 1124 on the memory input. Write mask registers 1126 allow predicating resulting vector writes.

Figure 12:
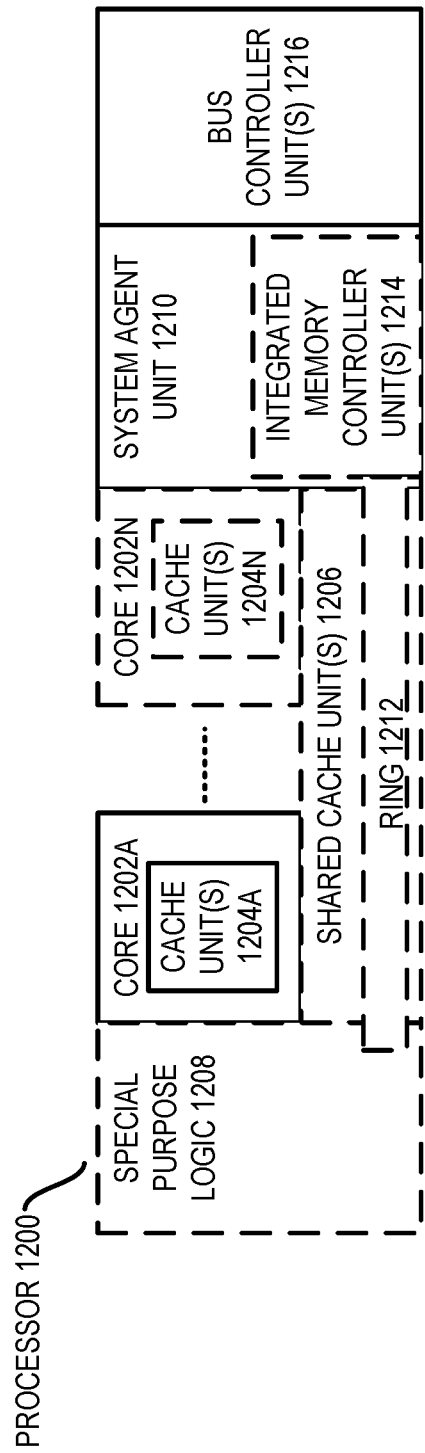
FIG. 12 is a block diagram of a processor that may have more than one core, may have an integrated memory controller, and may have integrated graphics.

FIG. 12 is a block diagram of a processor 1200 that may have more than one core, may have an integrated memory controller, and may have integrated graphics. The process of FIG. 12 may be configured to provide mitigation of return-oriented programming exploits, as disclosed in the present specification.

The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A-N, a set of one or more integrated memory controller unit(s) 1214 in the system agent unit 1210, and special-purpose logic 1208.

Thus, different implementations of the processor 1200 may include: 1) a CPU with the special-purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special-purpose cores intended primarily for graphics and/or scientific throughput; and 3) a coprocessor with the cores 1202A-N being a large number of general purpose in-order cores. Thus, the processor 1200 may be a general purpose processor, coprocessor or special-purpose processor, such as, for example, a network or communication processor, compression engine, graphics processor, GPGPU, a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the integrated graphics logic 1208, the set of shared cache units 1206, and the system agent unit 1210/integrated memory controller unit(s) 1214, alternative embodiments may use any number of well-known techniques for interconnecting such units. In one embodiment, coherency is maintained between one or more cache units 1206 and cores 1202A-N.

In some embodiments, one or more of the cores 1202A-N are capable of multithreading. The system agent 1210 includes those components coordinating and operating cores 1202A-N. The system agent unit 1210 may include, for example, a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of executing the same instruction set, while others may be capable of executing only a subset of that instruction set or a different instruction set.

Example Computer Architectures

Figure 13:
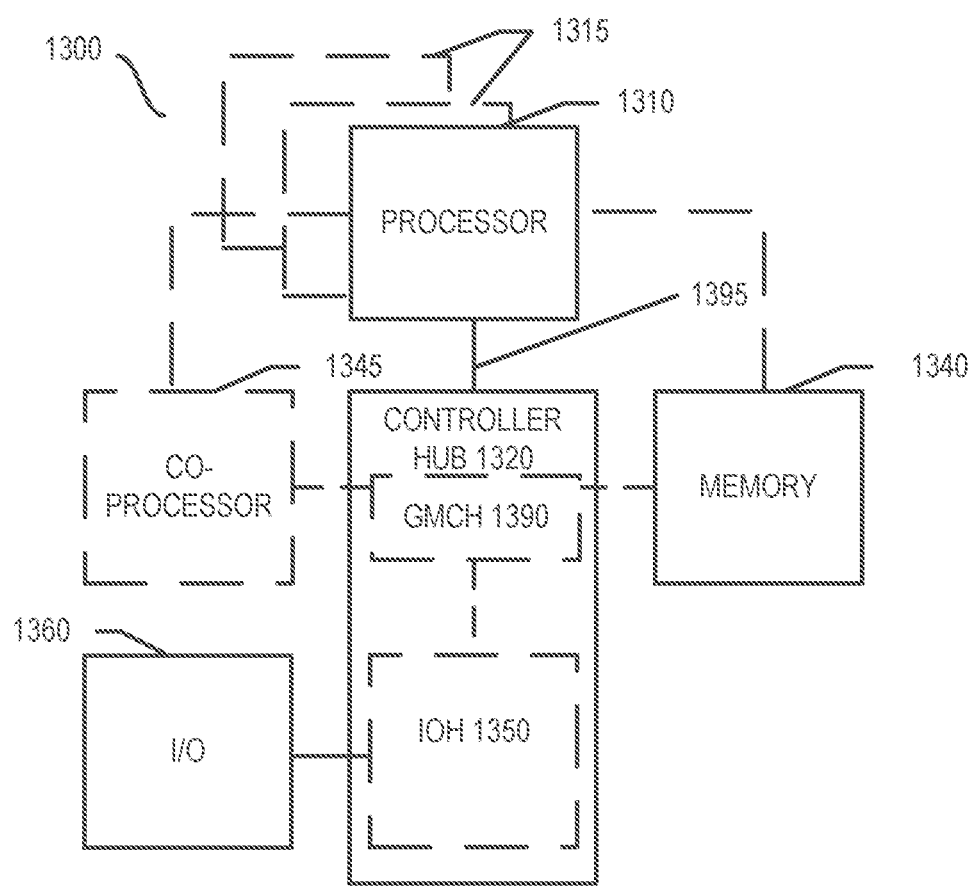
FIG. 13 is a block diagram of example computer architectures.

FIG. 13 is a block diagram of an example computer architecture. The computer architecture of FIG. 13 may be configured to provide mitigation of return-oriented programming exploits, as disclosed in the present specification.

Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

In the example of FIG. 13, illustrated is a block diagram of a system 1300. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multidrop bus, such as a frontside bus (FSB), point-to-point interface such as Ultra Path Interconnect (UPI), or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accepts and executes the received coprocessor instructions.

Figure 14:
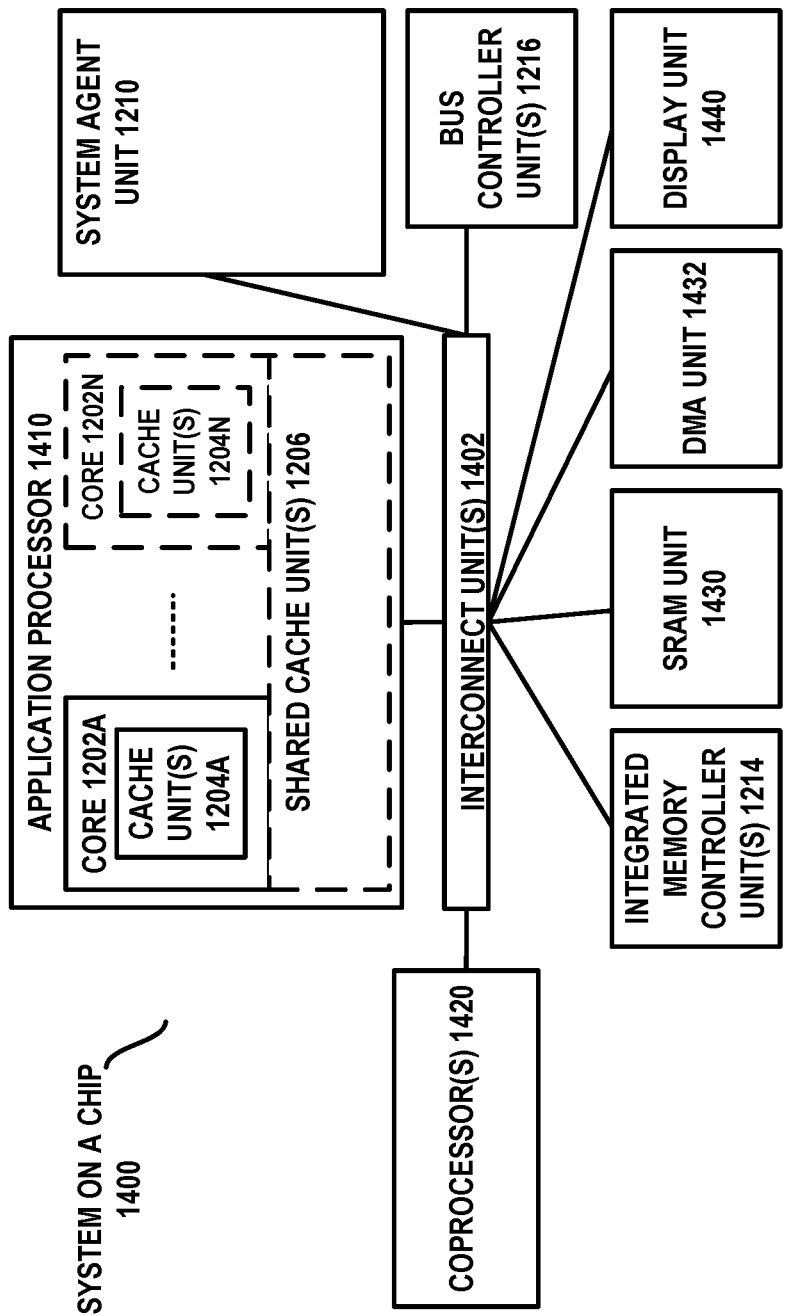
FIG. 14 is a block diagram of an example system-on-a-chip (SoC).

FIG. 14 is a block diagram of a system-on-a-chip (SoC) 1400. The SoC of FIG. 14 may be configured to provide mitigation of return-oriented programming exploits, as disclosed in the present specification.

Similar elements in FIG. 12 bear like reference numerals. Also, dashed lined boxes are optional features on more advanced SoCs. In FIG. 14, an interconnect unit(s) 1402 is coupled to: an application processor 1410 which includes a set of one or more cores 1202A-N and shared cache unit(s) 1206; a system agent unit 1210; a bus controller unit(s) 1216; IMC unit(s) 1214; a set of one or more coprocessors 1420 which may include integrated graphics logic, an image processor, an audio processor, and a video processor; a static random access memory (SRAM) unit 1430; a direct memory access (DMA) unit 1432; and a display unit 1440 for coupling to one or more external displays. In one embodiment, the coprocessor(s) 1420 includes a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Some embodiments may be implemented as computer programs or program code executing on programmable systems comprising at least one processor, a storage system (including volatile and nonvolatile memory and/or storage elements), at least one input device, and at least one output device.

Program code may be applied to input instructions to perform the functions described herein and generate output information. The output information may be applied to one or more output devices, in known fashion. For purposes of this application, a processing system includes any system that has a processor, such as, for example, a DSP, a microcontroller, an application-specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "intellectual property (IP) cores" may be stored on a tangible, machine-readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard discs, any other type of disk including floppy disks, optical disks, compact disc read-only memories (CD-ROMs), compact disc rewritables (CD-RWs), and magneto-optical disks, semiconductor devices such as ROMs, random access memories (RAMs) such as DRAMs, SRAMs, erasable programmable read-only memories (EPROMs), flash memories, electrically erasable programmable read-only memories (EEPROMs), PCM, magnetic or optical cards, or any other type of media suitable for storing electronic instructions.

Accordingly, some embodiments also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, etc.)

In some cases, an instruction converter may be used to convert an instruction from a source instruction set to a target instruction set. For example, the instruction converter may translate (e.g., using static binary translation or dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 15 is a block diagram contrasting the use of a software instruction converter to convert binary instructions in a source instruction set to binary instructions in a target instruction set. The software instruction converter of FIG. 15 may be configured to provide mitigation of return-oriented programming exploits, as disclosed in the present specification.

In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present specification.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

In the foregoing description, certain aspects of some or all embodiments are described in greater detail than is strictly necessary for practicing the appended claims. These details are provided by way of nonlimiting example only, for the purpose of providing context and illustration of the disclosed embodiments. Such details should not be understood to be required, and should not be "read into" the claims as limitations. The phrase may refer to "an embodiment" or "embodiments." These phrases, and any other references to embodiments, should be understood broadly to refer to any combination of one or more embodiments. Furthermore, the several features disclosed in a particular "embodiment" could just as well be spread across multiple embodiments. For example, if features 1 and 2 are disclosed in "an embodiment," embodiment A may have feature 1 but lack feature 2, while embodiment B may have feature 2 but lack feature 1.

This specification may provide illustrations in a block diagram format, wherein certain features are disclosed in separate blocks. These should be understood broadly to disclose how various features interoperate, but are not intended to imply that those features must necessarily be embodied in separate hardware or software. Furthermore, where a single block discloses more than one feature in the same block, those features need not necessarily be embodied in the same hardware and/or software. For example, a computer "memory" could in some circumstances be distributed or mapped between multiple levels of cache or local memory, main memory, battery-backed volatile memory, and various forms of persistent memory such as a hard disk, storage server, optical disk, tape drive, or similar. In certain embodiments, some of the components may be omitted or consolidated. In a general sense, the arrangements depicted in the FIGURES may be more logical in their representations, whereas a physical architecture may include various permutations, combinations, and/or hybrids of these elements. Countless possible design configurations can be used to achieve the operational objectives outlined herein. Accordingly, the associated infrastructure has a myriad of substitute arrangements, design choices, device possibilities, hardware configurations, software implementations, and equipment options.

References may be made herein to a computer-readable medium, which may be a tangible and non-transitory computer-readable medium. As used in this specification and throughout the claims, a "computer-readable medium" should be understood to include one or more computer-readable mediums of the same or different types. A computer-readable medium may include, by way of nonlimiting example, an optical drive (e.g., CD/DVD/Blu-Ray), a hard drive, a solid-state drive, a flash memory, or other nonvolatile medium. A computer-readable medium could also include a medium such as a ROM, an FPGA or ASIC configured to carry out the desired instructions, stored instructions for programming an FPGA or ASIC to carry out the desired instructions, an IP block that can be integrated in hardware into other circuits, or instructions encoded directly into hardware or microcode on a processor such as a microprocessor, DSP, microcontroller, or in any other suitable component, device, element, or object where appropriate and based on particular needs. A non-transitory storage medium herein is expressly intended to include any non-transitory special-purpose or programmable hardware configured to provide the disclosed operations, or to cause a processor to perform the disclosed operations.

Various elements may be "communicatively," "electrically," "mechanically," or otherwise "coupled" to one another throughout this specification and the claims. Such coupling may be a direct, point-to-point coupling, or may include intermediary devices. For example, two devices may be communicatively coupled to one another via a controller that facilitates the communication. Devices may be electrically coupled to one another via intermediary devices such as signal boosters, voltage dividers, or buffers. Mechanically coupled devices may be indirectly mechanically coupled.

Any "module" or "engine" disclosed herein may refer to or include software, a software stack, a combination of hardware, firmware, and/or software, a circuit configured to carry out the function of the engine or module, or any computer-readable medium as disclosed above. Such modules or engines may, in appropriate circumstances, be provided on or in conjunction with a hardware platform, which may include hardware compute resources such as a processor, memory, storage, interconnects, networks and network interfaces, accelerators, or other suitable hardware. Such a hardware platform may be provided as a single monolithic device (e.g., in a PC form factor), or with some or part of the function being distributed (e.g., a "composite node" in a high-end data center, where compute, memory, storage, and other resources may be dynamically allocated and need not be local to one another).

There may be disclosed herein flow charts, signal flow diagram, or other illustrations showing operations being performed in a particular order. Unless otherwise expressly noted, or unless required in a particular context, the order should be understood to be a nonlimiting example only. Furthermore, in cases where one operation is shown to follow another, other intervening operations may also occur, which may be related or unrelated. Some operations may also be performed simultaneously or in parallel. In cases where an operation is said to be "based on" or "according to" another item or operation, this should be understood to imply that the operation is based at least partly on or according at least partly to the other item or operation. This should not be construed to imply that the operation is based solely or exclusively on, or solely or exclusively according to the item or operation.

All or part of any hardware element disclosed herein may readily be provided in an SoC, including a CPU package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

In a general sense, any suitably-configured circuit or processor can execute any type of instructions associated with the data to achieve the operations detailed herein. Any processor disclosed herein could transform an element or an article (for example, data) from one state or thing to another state or thing. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms "memory" and "storage," as appropriate.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

EXAMPLE IMPLEMENTATIONS

There is disclosed in one example, a computing apparatus, comprising: a processor; a memory; and encoded logic to instruct the processor to: identify within the memory a payload that is suspected to be a return-oriented programming (ROP) chain; execute the suspected ROP chain in a speculative execution path within the processor; force a missed prediction of the speculative execution path; determine that the suspected ROP chain executed through; and take a security action responsive to the determining.

There is further disclosed an example computing apparatus, wherein executing the suspected ROP chain the speculative execution path comprises populating a stack return register with a pointer to the suspected ROP chain.

There is further disclosed an example computing apparatus, wherein determining that the suspected ROP chain executed through comprises appending a canary instruction to the end of the suspected ROP chain, and determining that the canary instruction was executed.

There is further disclosed an example computing apparatus, wherein the canary instruction comprises a dummy label.

There is further disclosed an example computing apparatus, wherein the canary instruction comprises a load from a memory address.

There is further disclosed an example computing apparatus, wherein determining that the suspected ROP chain executed through comprises determining that the memory address of the canary instruction is located in cache.

There is further disclosed an example computing apparatus, wherein determining that the suspected ROP chain executed through comprises loading the address of the canary instruction, and measuring the time for loading the address to complete.

There is further disclosed an example computing apparatus, wherein determining that the suspected ROP malware is malicious comprises determining that the label was loaded to cache.

There is further disclosed an example computing apparatus, wherein determining that the label was loaded to cache comprises determining a latency to fetch the label.

There is further disclosed an example computing apparatus, wherein the logic is further to perform a cache flash before executing the suspected ROP chain.

There is further disclosed an example computing apparatus, further comprising encoded logic to force an increased latency on a speculative execution window.

There is further disclosed an example computing apparatus, wherein forcing the increased latency comprises adding memory access latency.

There is further disclosed an example computing apparatus, wherein forcing the increased latency comprises inserting a computing latency.

There is further disclosed an example computing apparatus, wherein forcing the increased latency comprises forcing a port contention.

There is also disclosed an example of one or more tangible, non-transitory computer-readable mediums having stored thereon executable instructions to: dynamically scan a binary object to identify a potential return-oriented programming (ROP) chain; append a canary instruction to the end of the potential ROP chain; execute the potential ROP chain; determine that the canary instruction was executed; and based at least in part on the determining, designate the potential ROP chain as an ROP chain.

There is further disclosed an example of one or more tangible, non-transitory computer-readable mediums, wherein the instructions are further to take a security action based on the designating.

There is further disclosed an example of one or more tangible, non-transitory computer-readable mediums, wherein executing the potential ROP chain comprises executing the potential ROP chain in a speculative execution path.

There is further disclosed an example of one or more tangible, non-transitory computer-readable mediums, wherein executing the potential ROP chain comprises forcing a missed prediction.

There is further disclosed an example of one or more tangible, non-transitory computer-readable mediums, wherein the instructions are further to force an increased latency on a speculative execution window.

There is further disclosed an example of one or more tangible, non-transitory computer-readable mediums, wherein forcing the increased latency comprises adding memory access latency.

There is further disclosed an example of one or more tangible, non-transitory computer-readable mediums, wherein forcing the increased latency comprises inserting a computing latency.

There is further disclosed an example of one or more tangible, non-transitory computer-readable mediums, wherein forcing the increased latency comprises forcing a port contention.

There is further disclosed an example of one or more tangible, non-transitory computer-readable mediums, wherein the canary instruction comprises a dummy label.

There is further disclosed an example of one or more tangible, non-transitory computer-readable mediums, wherein the canary instruction comprises a load from a memory address.

There is further disclosed an example of one or more tangible, non-transitory computer-readable mediums, wherein determining that the canary instruction was executed comprises determining that the memory address of the canary instruction is located in cache.

There is further disclosed an example of one or more tangible, non-transitory computer-readable mediums, wherein determining that the canary instructions was executed comprises loading the address of the canary instruction, and measuring the time for loading the address to complete.

There is further disclosed an example of one or more tangible, non-transitory computer-readable mediums, wherein the canary instruction comprises a label, and wherein determining that the canary instruction was executed comprises determining that the label is in cache.

There is further disclosed an example of one or more tangible, non-transitory computer-readable mediums, wherein determining that the label is in cache comprises determining a latency to fetch the label.

There is further disclosed an example of one or more tangible, non-transitory computer-readable mediums, wherein the instructions are further to perform a cache flash before executing the potential ROP chain.

There is also disclosed an example computer-implemented method of detecting a return-oriented programming (ROP) exploit, comprising: appending a dummy instruction to the end of a suspected ROP chain; executing the suspected ROP chain; determining that the dummy instruction was executed; and designating the suspected ROP chain as an ROP chain.

There is further disclosed an example method, further comprising taking a security action based on the designating.

There is further disclosed an example method, wherein executing the suspected ROP chain comprises executing within a speculative execution path that does not affect an architectural state on a missed prediction.

There is further disclosed an example method, further comprising forcing a missed prediction.

There is further disclosed an example method, further comprising forcing a latency on a speculative execution window.

There is further disclosed an example method, wherein forcing the increased latency comprises adding memory access latency.

There is further disclosed an example method, wherein forcing the increased latency comprises inserting a computing latency.

There is further disclosed an example method, wherein forcing the increased latency comprises forcing a port contention.

There is further disclosed an example method, wherein the dummy instruction inserts a dummy label.

There is further disclosed an example method, wherein the dummy instruction comprises a load from a memory address.

There is further disclosed an example method, wherein determining that the dummy instruction was executed comprises determining that the memory address of the dummy instruction was loaded to cache.

There is further disclosed an example method, wherein determining that the dummy instruction was executed comprises loading the address of the dummy instruction, and measuring the time for loading the address to complete.

There is further disclosed an example method, wherein the dummy instruction comprises loading a label, and wherein determining that the dummy instruction was executed comprises determining that the label is located in cache.

There is further disclosed an example method, wherein determining that the label is located in cache comprises determining a latency to fetch the label.

There is further disclosed an example method, further comprising performing a cache flush before executing the suspected ROP chain.

There is further disclosed an example apparatus, comprising means for performing the method of a number of the above examples.

There is further disclosed an example apparatus, wherein the means for performing the method comprise a processor and a memory.

There is further disclosed an example apparatus, wherein the memory comprises machine-readable instructions, that when executed cause the apparatus to perform the method of a number of the above examples.

There is further disclosed an example apparatus, wherein the apparatus is a computing system.

There is further disclosed an example of at least one computer-readable medium comprising instructions that, when executed, implement a method or realize an apparatus as illustrated in a number of the above examples.

What is claimed is:

1. A computing apparatus, comprising:
    a processor;
    a memory; and
    encoded logic to instruct the processor to:
        identify within the memory a payload that is suspected to be a return-oriented programming (ROP) chain;
        execute the suspected ROP chain in a speculative execution path within the processor;
        force a missed prediction of the speculative execution path;
        determine that the suspected ROP chain executed through, comprising determining that a canary instruction appended to the suspected ROP chain was executed; and
        take a security action responsive to the determining.

2. The computing apparatus of claim 1, wherein executing the suspected ROP chain the speculative execution path comprises populating a stack return register with a pointer to the suspected ROP chain.

3. The computing apparatus of claim 1, wherein the canary instruction comprises a dummy label.

4. The computing apparatus of claim 1, wherein the canary instruction comprises a load from a memory address.

5. The computing apparatus of claim 4, wherein determining that the suspected ROP chain executed through comprises determining that the memory address of the canary instruction is located in cache.

6. The computing apparatus of claim 4, wherein determining that the suspected ROP chain executed through comprises loading the address of the canary instruction, and measuring the time for loading the address to complete.

7. The computing apparatus of claim 4, wherein determining that the suspected ROP malware is malicious comprises determining that the label was loaded to cache.

8. The computing apparatus of claim 5, wherein determining that the label was loaded to cache comprises determining a latency to fetch the label.

9. The computing apparatus of claim 6, wherein the logic is further to perform a cache flush before executing the suspected ROP chain.

10. The computing apparatus of claim 1, further comprising encoded logic to force an increased latency on a speculative execution window.

11. The computing apparatus of claim 10, wherein forcing the increased latency comprises adding memory access latency.

12. One or more tangible, non-transitory computer-readable mediums having stored thereon executable instructions to:
    dynamically scan a binary object to identify a potential return-oriented programming (ROP) chain;
    append a canary instruction to the end of the potential ROP chain;
    execute the potential ROP chain within a speculative execution path, and force a missed prediction;
    determine that the canary instruction was executed; and
    based at least in part on the determining, designate the potential ROP chain as an ROP chain.

13. The one or more tangible, non-transitory computer-readable mediums of claim 12, wherein the instructions are further to take a security action based on the designating.

14. The one or more tangible, non-transitory computer-readable mediums of claim 12, wherein the canary instruction comprises a dummy label.

15. A computer-implemented method of detecting a return-oriented programming (ROP) exploit, comprising:
    appending a dummy instruction to the end of a suspected ROP chain;
    executing the suspected ROP chain within a speculative execution path that does not affect an architectural state on a missed prediction;
    determining that the dummy instruction was executed; and
    designating the suspected ROP chain as an ROP chain.

16. The method of claim 15, further comprising taking a security action based on the designating.

17. The one or more tangible, non-transitory computer-readable mediums of claim 12, wherein the canary instruction comprises a load from a memory address.

18. The one or more tangible, non-transitory computer-readable mediums of claim 17, wherein determining that the suspected ROP chain executed through comprises determining that the memory address of the canary instruction is located in cache.

19. The method of claim 15, wherein the dummy instruction comprises a dummy label.

20. The method of claim 15, wherein the dummy instruction comprises a load from a memory address.

21. The method of claim 20, wherein determining that the suspected ROP chain executed through comprises determining that the memory address of the dummy instruction is located in cache.

* * * * *